(12) United States Patent
Katayama

(10) Patent No.: US 7,599,276 B2
(45) Date of Patent: Oct. 6, 2009

(54) OPTICAL HEAD DEVICE AND OPTICAL INFORMATION RECORDING/REPRODUCTION APPARATUS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 730 days.

(21) Appl. No.: 11/130,184

(22) Filed: May 17, 2005

(65) Prior Publication Data

US 2005/0259553 A1    Nov. 24, 2005

(30) Foreign Application Priority Data

May 18, 2004    (JP)    ............................... 2004-147816

(51) Int. Cl.
     *G11B 7/00*    (2006.01)
(52) U.S. Cl. ............................ 369/112.19; 369/112.02
(58) Field of Classification Search ........................ None
See application file for complete search history.

(56) References Cited

U.S. PATENT DOCUMENTS

| | | | | |
|---|---|---|---|---|
| 6,151,154 | A * | 11/2000 | Ogasawara et al. | ......... 359/279 |
| 2001/0021162 | A1 * | 9/2001 | Kikuchi et al. | ......... 369/112.02 |
| 2005/0237902 | A1 * | 10/2005 | Nishiwaki et al. | ...... 369/112.12 |

FOREIGN PATENT DOCUMENTS

| | | |
|---|---|---|
| JP | 9-145921 A | 6/1997 |
| JP | 9-167347 A | 6/1997 |
| JP | 11-54411 A | 2/1999 |
| JP | 2000-242959 A | 9/2000 |
| JP | 2000-268398 A | 9/2000 |
| JP | 2002-342975 A | 11/2002 |
| JP | 2003-006914 A | 1/2003 |
| JP | 2003-178448 A | 6/2003 |
| JP | 2004-24083 A | 8/2005 |

OTHER PUBLICATIONS

Yoshizawa, "An Analysis of Optical Anisotropy of PC Substrate for Magneto-Optical Disc", Kogaku, Oct. 1985, vol. 15, No. 5, pp. 414-421.

* cited by examiner

*Primary Examiner*—Joseph H Feild
*Assistant Examiner*—Christopher R Lamb
(74) *Attorney, Agent, or Firm*—Sughrue Mion, PLLC

(57) ABSTRACT

In an optical head device, a birefringence correcting element 5a containing a material showing mono-axial refractive index anisotropy is located before an objective lens. The birefringence correcting element 5a is circumferentially divided into four regions by two straight lines passing through an optical axis and intersecting each other at right angle. Each of the four regions is radially divided into four sub-regions by three circles centered at the optical axis. The direction of optic axes of the sub-regions 11a to 14a and 11c to 14c is a direction of x-axis, while the direction of optic axes of the sub-regions 11b to 14b and 11d to 14d is a direction of y-axis. A phase difference of sub-regions between a polarized light component polarized in a direction parallel to the optic axis and another polarized light component polarized in a direction vertical to the optic axis increases in order of the sub-regions 11a to 11d, sub-regions 12a to 12d, sub-regions 13a to 13d and the sub-regions 14a to 14d.

14 Claims, 14 Drawing Sheets

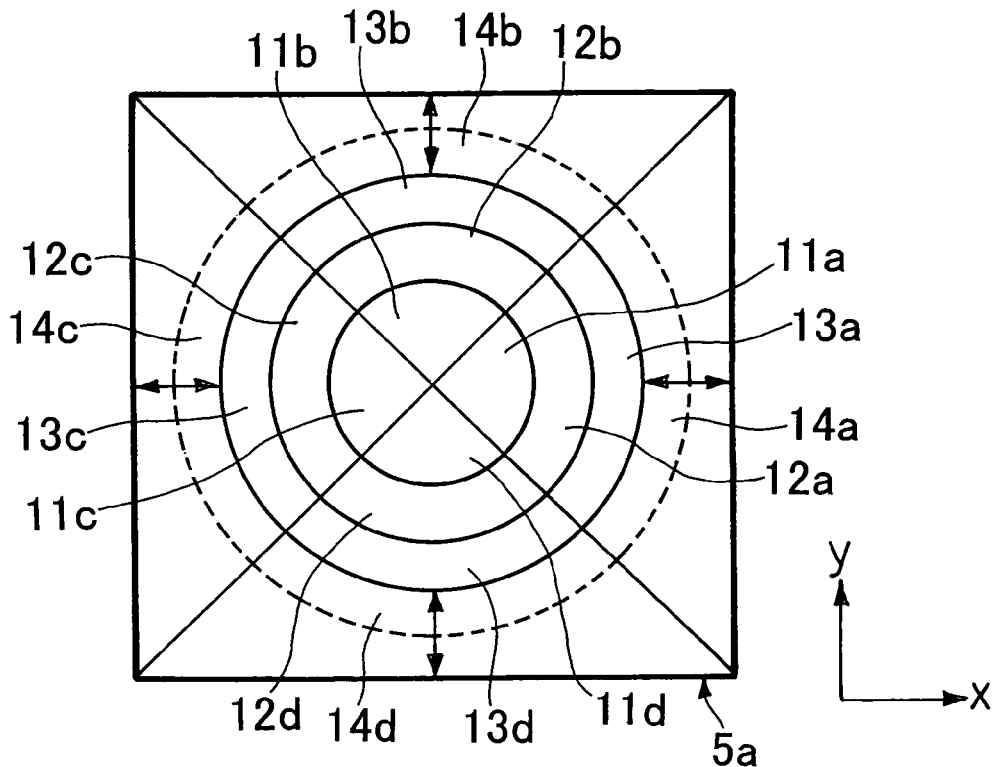
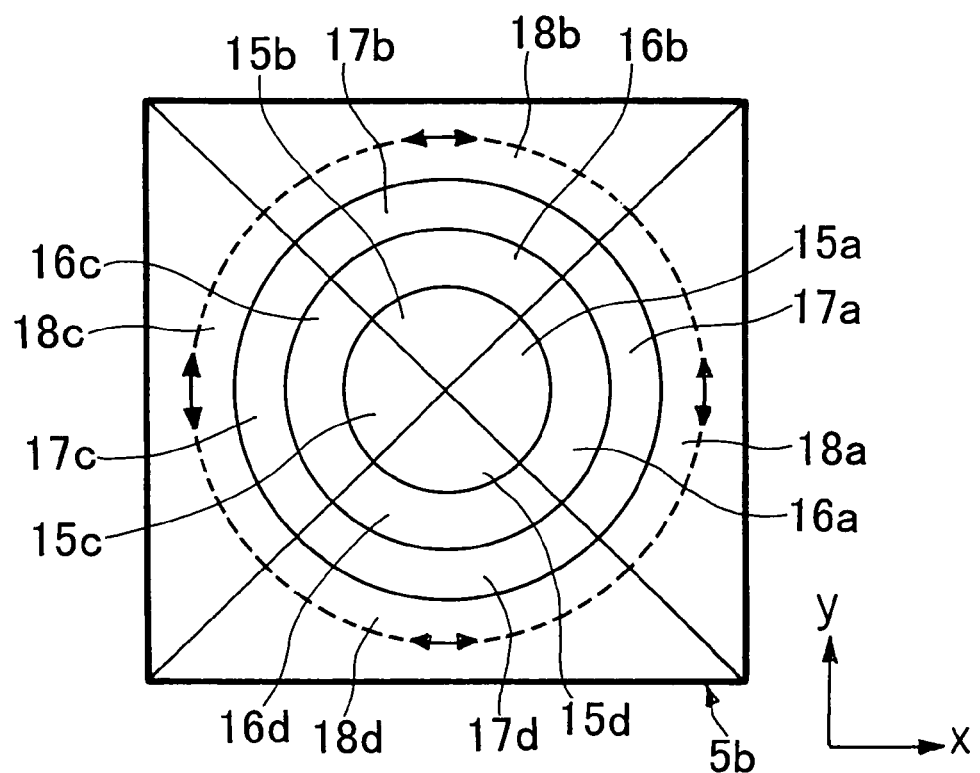

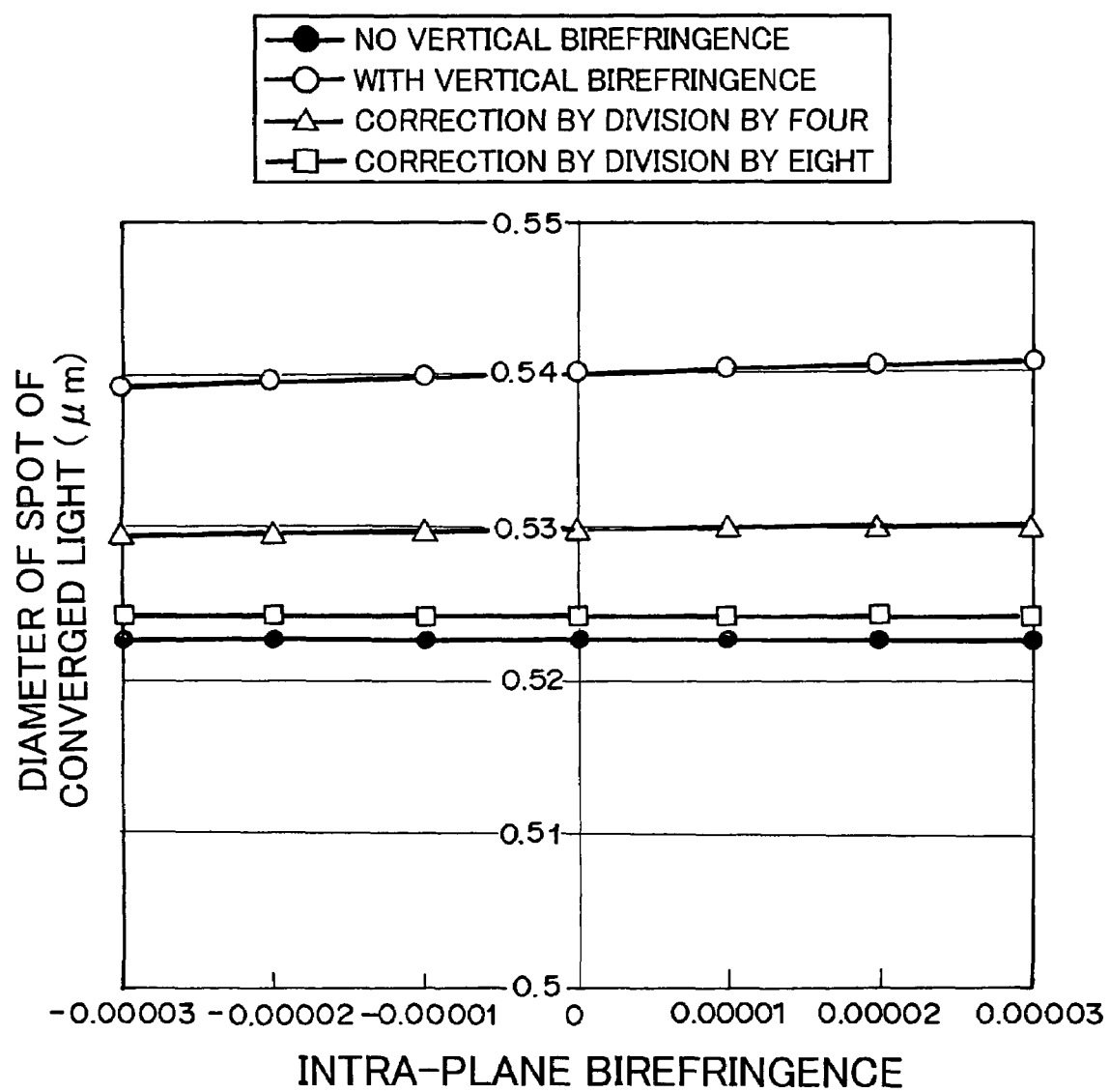

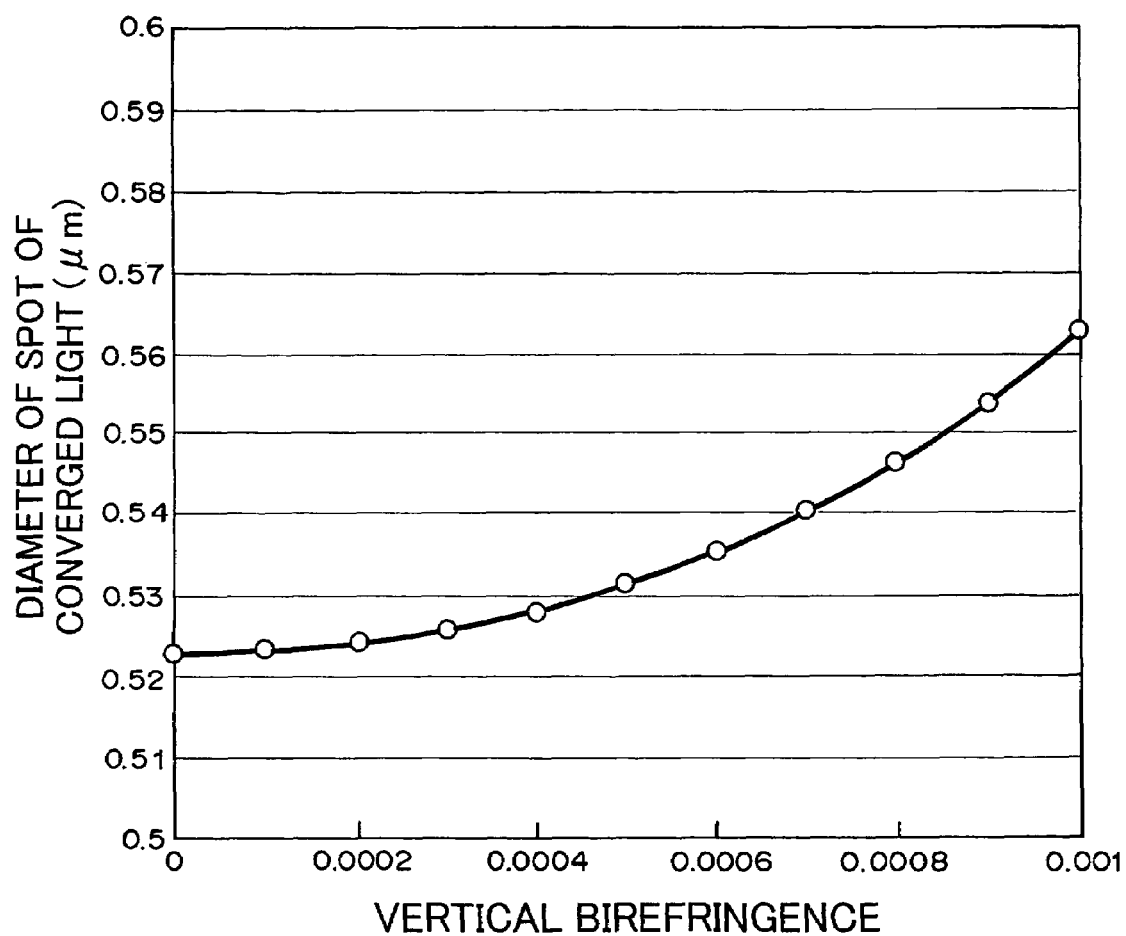

OPTICAL HEAD DEVICE AND OPTICAL INFORMATION RECORDING/REPRODUCTION APPARATUS

BACKGROUND OF THE INVENTION

1. Field of the Invention

This invention relates to an optical head device and an optical information recording/reproduction apparatus adapted to show excellent recording/reproduction characteristics by correcting the influence of birefringence of the protection layer of the optical recording medium on incident light or reflected light.

2. Description of Related Art

FIG. 15A of the accompanying drawings schematically illustrates a known popular optical head device. Incident light from a semiconductor laser 1, which is a light source, is collimated by a collimator lens 2 and enters a polarization beam splitter 3 as P-polarized light so as to be transmitted through it substantially by 100%. Then, it is transmitted through a ¼ wave plate 4 and converted into circularly polarized light from linearly polarized light before it is converged on a disk 7, which is an optical recording medium, by means of an objective lens 6. Light reflected by the disk 7 is transmitted through the objective lens 6 and the ¼ wave plate 4 in the opposite direction, where it is converted into linearly polarized light with a direction of polarization orthogonal relative to the direction of polarization of forward-moving light from circularly polarized light, before it enters the polarization beam splitter 3 as S-polarized light and is reflected substantially by 100%. Then, it is transmitted through a cylindrical lens 8 and a convex lens 9 and received by a photo-detector 10.

Meanwhile, while the protection layer of the optical recording medium is normally made of inexpensive polycarbonate, polycarbonate gives rise to birefringence. If the protection layer of the disk 7 of FIG. 15A, which is an optical recording medium, gives rise to birefringence, the diameter of the spot of converged light that is formed on the disk 7 is enlarged and the light receiving rate of the photo-detector 10 falls.

It should be noted here that the protection layer refers to the substrate of an optical recording medium when light is made to strike the recording surface of the optical recording medium by way of the substrate, whereas the protection layer refers to the cover layer of the optical recording medium when light is made to strike the recording surface of the optical recording medium by way of the cover layer in the following description.

If the protection layer of the disk 7 is free from birefringence, light reflected by the disk 7 is transmitted through the ¼ wave plate 4 to become S-polarized light relative to the polarization beam splitter 3. Therefore, it is reflected by the polarization beam splitter 3 substantially by 100% and received by the photo-detector 10. However, if the protection layer of the disk 7 gives rise to birefringence, light reflected by the disk 7 is transmitted through the ¼ wave plate 4 to normally become elliptically polarized light. In other words, the S-polarized light component is reduced relative to the polarization beam splitter 3 and a P-polarized light component is produced. Then, while the S-polarized light component is reflected by the polarization beam splitter 3 substantially by 100% and received by the photo-detector 10, the P-polarized light component is transmitted-through the polarization beam splitter 3 substantially by 100% and returned to the semiconductor laser 1. This is why the light receiving rate of the photo-detector 10 falls.

The birefringence of the protection layer of an optical recording medium involves intra-plane or horizontal birefringence and vertical or perpendicular birefringence as described in Non-Patent Document 1 (Yoshizawa, "An Analysis of Optical Anisotropy of PC Substrate for Magneto-Optical Disc", KOGAKU, Oct., 1985, Vol. 15, No. 5, pp. 414-421). Now, let us define the relationship between the disk 7, which is an optical recording medium, and an XYZ coordinate system as shown in FIG. 15B. The X-axis, the Y-axis and the Z-axis respectively agree with a radial direction, a tangential direction and a normal direction of the disk 7. The protection layer of an optical recording medium normally shows biaxial refractive index anisotropy and the three principal axes thereof substantially agree with the X-axis, the Y-axis and the Z-axis respectively. If the corresponding three principal refractive indexes are nx, ny, nz and the intra-plane birefringence and the vertical birefringence are respectively $\Delta n \parallel$ and $\Delta n \perp$, the intra-plane birefringence is defined by $\Delta n \parallel = |nx-ny|$ and the vertical birefringence is defined by $\Delta n \perp = |(nx+ny)/2 - nz|$ respectively.

Both the intra-plane birefringence and vertical birefringence enlarge the diameter of the spot of converged light that is formed on an optical recording medium and reduce the light receiving rate of the photo-detector. However, they differ from each other in terms of how they affect light being transmitted through the protection layer of the optical recording medium. While the influence of intra-plane birefringence does not depend on the angle of incidence of light relative to the optical recording medium, that of vertical birefringence is dependent on the angle of incidence of light relative to the optical recording medium. More specifically, the influence of vertical birefringence is nil when the angle of incidence is 0° but the influence increases as a function of the angle of incidence. For this reason, vertical birefringence is generally more influential than intra-plane birefringence relative to the recording/reproduction characteristics. Both an increase in the diameter of the spot of converged light and fall in the light receiving rate due to vertical birefringence entail a fall in the resolution and an increase of the crosstalk of the reproduced signal.

FIG. 16 illustrates the computationally determined relationship between the vertical birefringence of the protection layer of an optical recording medium and the diameter of the spot of converged light on an assumption that the wavelength of light from the light source is 405 nm and the numerical aperture of the objective lens is 0.65 while the protection layer of the optical recording medium is 0.6 mm thick. It will be appreciated that the diameter of the spot of converged light rapidly increases as the vertical birefringence rises. The vertical birefringence of the protection layer of any optical recording medium is uniquely determined by the material of the layer. It is about 0.0007 when it is made of polycarbonate. Thus, the diameter of the spot of converged light is about 0.523 μm when the protection layer is free from vertical birefringence, whereas it is enlarged to about 0.540 μm when the protection layer involves vertical birefringence that is produced by polycarbonate.

An optical head device disclosed in Patent Document 1 (JP(A)-2000-268398) comprises a liquid crystal panel for correcting the influence of the intra-plane birefringence of the protection layer of an optical recording medium on incident light or reflected light. The liquid crystal panel has an optic axis running in a predetermined direction and is adapted to offset the phase difference produced by the intra-plane birefringence by giving a predetermined phase difference to transmitted light.

However, the effect of correcting the influence of intra-plane birefringence of the liquid crystal panel of the above cited Patent Document 1 is not sufficient because the liquid crystal molecules in the liquid crystal panel are oriented in the same direction, although the direction of the optic axis for correcting the influence of vertical birefringence on incident light or reflected light and the phase difference produced by vertical birefringence vary as a function of the position in the liquid crystal panel.

SUMMARY OF THE INVENTION

In view of the above identified circumstances, it is therefore an object of the present invention to provide an optical head device and an optical information recording/reproduction apparatus that can dissolve the problems of known optical head devices and provide excellent recording/reproduction characteristics by highly precisely correcting the influence of the vertical birefringence of the protection layer of an optical recording medium on incident light or reflected light.

In an aspect of the present invention, the above object is achieved by providing an optical head device comprising: a light source; an objective lens for converging an emitted light emitted from the light source on an optical recording medium; a photo-detector for receiving a reflected light reflected by the optical recording medium; an optical separator element for separating the emitted light and the reflected light; and a birefringence correcting element for correcting an influence of birefringence of a protection layer of the optical recording medium on the emitted light or reflected light. The birefringence correcting element has an optic axis whose direction changes as a function of an intra-plane position thereof on the birefringence correcting element and a phase difference between a polarized light component polarized in a direction parallel to the optic axis and another polarized light component polarized in a direction vertical to the optic axis changes as a function of intra-plane positions thereof on the birefringence correcting element.

The influence of the vertical birefringence of the protection layer of the optical recording medium shows a certain given pattern that is centered at an optical axis of incident light or reflected light. This influence can be offset by designing the birefringence correcting element so as to make it show the optic axis and the phase difference as described above. This will be described in greater detail hereinafter by using mathematical formulas.

The birefringence correcting element may be arranged between the optical separator element and the objective lens.

The birefringence correcting element may be made to produce a phase difference necessary for offsetting a phase difference produced when emitted light or reflected light is transmitted through the protection layer of the optical recording medium at the time when emitted light or reflected light is transmitted through the birefringence correcting element.

The birefringence correcting element may contain a material showing mono-axial refractive index anisotropy. Then, the birefringence correcting element may be circumferentially divided into a plurality of regions around the optical axis of emitted light or reflected light by at least one straight line passing through the optical axis and each of the plurality of regions produced around the optical axis by the division may be radially divided into a plurality of sub-regions by at least one circle centered at the optical axis. The direction of the optic axis in the plurality of regions produced by circumferential division around the optical axis is fixed in each of the regions to a radial direction or a tangential direction of a circle centered at the optical axis in a circumferentially central part of each of the regions. The phase difference in the plurality of sub-regions formed by radial division is fixed in each of the sub-regions and monotonously increases from the inner sub-regions toward the outer sub-regions along the radial direction. More specifically, the material showing mono-axial refractive index anisotropy may be a liquid crystal polymer.

The birefringence correcting element may be made of a material showing refractive index isotropy and made further to show mono-axial refractive index anisotropy by utilizing structural birefringence. Then, the birefringence correcting element may be made to have a concentric circular lattice centered at the optical axis of emitted light or reflected light. More specifically, the lattice comprises projections and recesses and, if a ratio of an area occupied by projection to an area occupied by recesses in a period of the lattice is expressed as duty ratio, the duty ratio may be made to change continuously as a function of the distance from the optical axis.

In another aspect of the present invention, there is provided an optical information recording/reproduction apparatus comprising: an optical head device according to the invention as defined above; a first circuit for driving the light source; a second circuit for generating a reproduction signal and an error signal according to an output signal of the photo-detector; and a third circuit for controlling a position of the objective lens according to the error signal. The first circuit may drive the light source so as to make a power of the emitted light change as a function of a signal to be recorded. Alternatively, the first circuit may drive the light source so as to make a power of the emitted light show a fixed value.

In other words, an optical head device according to the invention comprises: a light source; an objective lens for converging an emitted light emitted from the light source on an optical recording medium; a photo-detector for receiving a reflected light reflected by the optical recording medium; and an optical separator element for separating the emitted light emitted from the light source and the reflected light reflected by the optical recording medium; the optical head device further comprising: a birefringence correcting element for correcting an influence of vertical birefringence of a protection layer of the optical recording medium on the emitted light or reflected light.

In still another aspect of the present invention, there is provided an optical information recording/reproduction apparatus comprising: an optical head device according to the invention as defined above; a first circuit for driving the light source; a second circuit for generating a reproduction signal and an error signal according to an output signal of the photo-detector; and a third circuit for controlling a position of the objective lens according to the error signal.

If the protection layer of an optical recording medium involves vertical birefringence, a certain given phase difference is produced between a polarized light component polarized in a given direction and another polarized light component polarized in a direction perpendicular to the given direction when light is transmitted through the protection layer of the optical recording medium. However, according to the invention, a phase difference is produced to offset the above described phase difference when light is transmitted through the birefringence correcting element. Thus, the diameter of the converged spot of light that is formed on the optical recording medium is not enlarged at all as in the case of a protection layer that does not involve vertical birefringence. Then, the light receiving rate of the photo-detector does not fall. Therefore, the present invention suppresses the fall in the resolution and the increase of the crosstalk of the reproduced signal and provides excellent recording/reproduction characteristics.

According to the present invention, while the influence of the vertical birefringence of the protection layer of the optical recording medium on an incident light or reflected light shows a certain given pattern that is centered at the optical axis of incident light or reflected light, the influence of the vertical birefringence of the protection layer of an optical recording medium on the incident light or reflected light can be highly precisely corrected by designing the birefringence correcting element so as to make it show an optic axis and a phase difference that correspond to the distribution pattern. More specifically, the influence of the vertical birefringence of the protection layer of an optical recording medium on the incident light or reflected light can be highly precisely corrected by designing the birefringence correcting element so as to make it show an optic axis running in a radial direction or a tangential direction of a circle centered at the optical axis of incident light or reflected light and, at the same time, the phase difference between the polarized light component polarized in a direction parallel to the optic axis and the polarized light component polarized in a direction vertical to the optic axis increases as a function of the distance from the optical axis.

An optical head device according to the invention can be manufactured with ease when the birefringence correcting element is divided into a plurality of regions in such a way that both the direction of the optic axis and the magnitude of the phase difference are fixed in each of the regions.

In other words, the present invention provides excellent recording/reproduction characteristics by correcting the influence of the vertical birefringence of the protection layer of an optical recording medium on incident light or reflected light. This is because the phase difference produced when light is transmitted through the protection layer of the optical recording medium is offset by the phase difference produced when light is transmitted through the birefringence correcting element so that the diameter of the converged spot of light that is formed on the optical recording medium is not enlarged at all as in the case of a protection layer that does not involve vertical birefringence and the light receiving rate of the photo-detector does not fall.

BRIEF DESCRIPTION OF THE DRAWINGS

FIG. 2 is a schematic plan view of the birefringence correcting element of the first embodiment of optical head device according to the invention;

FIG. 3 is a schematic plan view of the birefringence correcting element of a second embodiment of optical head device according to the invention;

FIG. 8 is a graph illustrating the computationally determined relationship between the intra-plane birefringence of the protection layer of an optical recording medium and the diameter of the spot of converged light formed on the optical recording medium;

FIG. 16 is a graph illustrating the computationally determined relationship between the vertical birefringence of the protection layer of an optical recording medium and the diameter of the spot of converged light formed on the optical recording medium.

DETAILED DESCRIPTION OF THE PREFERRED EMBODIMENTS

Now, the present invention will be described in greater detail by referring to the accompanying drawings that illustrate preferred embodiments of the invention.

Figure 1:
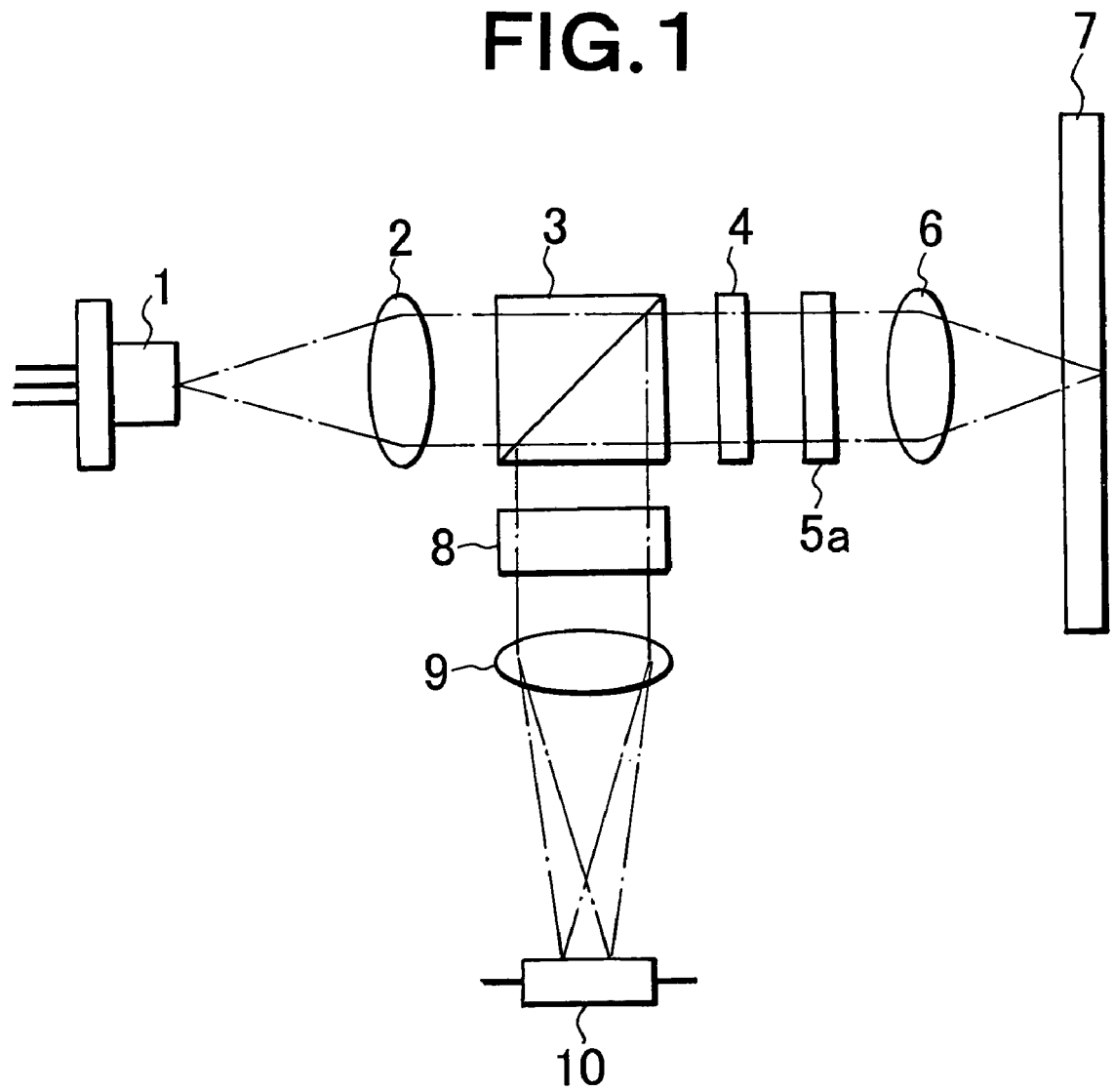
FIG. 1 is a schematic diagram of a first embodiment of optical head device according to the invention.

FIG. 1 is a schematic diagram of the first embodiment of optical head device according to the invention. Referring to FIG. 1, light emitted from a semiconductor laser 1, which is the light source of the embodiment, is collimated by a collimator lens 2. Then, it enters a polarization beam splitter 3 as P-polarized light and transmitted through it substantially by 100%. Subsequently, it is transmitted through a ¼ wave plate 4 and converted into circularly polarized light from linearly polarized light before it is transmitted through a birefringence correcting element 5a and converged on a disk 7, which is an optical recording medium, by means of an objective lens 6. Light reflected by the disk 7 is transmitted through the objective lens 6, the birefringence correcting element 5a and the ¼ wave plate 4 in the opposite direction, where it is converted into linearly polarized light with a direction of polarization orthogonal relative to the direction of polarization of forward-moving light from circularly polarized light, before it enters the polarization beam splitter 3 as S-polarized light and is reflected substantially by 100%. Then, it is transmitted through a cylindrical lens 8 and a convex lens 9 and received by a photo-detector 10. The photo-detector 10 is arranged between the two focal lines of the cylindrical lens 8 and the convex lens 9 and has a light receiving portion that is divided into four partitions, or four light receiving sections, by a dividing line running in parallel with a radial direction of the disk 7 and a dividing line running in parallel with a tangential line of the disk 7. A focus error signal obtained by means of an astigmatism process, a track error signal obtained by means of a phase difference technique or a push-pull technique and an RF signal are produced on the basis of the outputs of the light receiving sections.

FIG. 2 is a schematic plan view of the birefringence correcting element 5a. The birefringence correcting element 5a is circumferentially divided into four regions that extend toward the outer periphery by two straight lines passing through the optical axis and spaced apart from each other by an angular space of 90°. Each of the regions is radially divided into four regions, or sub-regions, by three coaxial circles centered at the optical axis. In FIG. 2, the circle of a dotted line indicates the effective area of the objective lens 6. The birefringence correcting element 5a contains a material that shows mono-axial refractive index anisotropy. The arrows in FIG. 2 indicate the directions of the respective optic axes of the four regions.

The direction of the optic axes of the sub-regions 11a, 12a, 13a, 14a located at the right side and the sub-regions 11c, 12c, 13c, 14c located at the left side in FIG. 2 are set to a direction of angle 0° relative to the x-axis in FIG. 2. The direction of the optic axes of the sub-regions 11b, 12b, 13b, 14b located at the top side and the sub-regions 11d, 12d, 13d, 14d located at the bottom side in FIG. 2 are set to a direction of angle 90° relative to the x-axis in FIG. 2. The phase difference between the polarized light component in a direction parallel to the optic axis and the polarized light component in a direction perpendicular to the optic axis shows the following values. It is equal to 0° in the sub-regions 11a, 11b, 11c, 11d located closest to the center and equal to 18° in the sub-regions 12a, 12b, 12c, 12d located immediately outside the above sub-regions, whereas it is equal to 36° in the sub-regions 13a, 13b, 13c, 13d located immediately outside the sub-regions that are second-closest to the center and equal to 54° in the outermost sub-regions 14a, 14b, 14c, 14d.

As pointed out above, the optical head device of this embodiment comprises a birefringence correcting element 5a containing a material that shows mono-axial refractive index anisotropy and arranged in front of the objective lens 6 of the optical system thereof. The birefringence correcting element 5a is circumferentially divided into four regions that extend toward the outer periphery by two straight lines passing through the optical axis and spaced apart from each other by an angular space of 90°. Each of the regions is radially divided into four regions, or sub-regions, by three coaxial circles centered at the optical axis. The direction of the optic axes of the sub-regions 11a, 12a, 13a, 14a and the sub-regions 11c, 12c, 13c, 14c in FIG. 2 are set to a direction of the x-axis in FIG. 2. The direction of the optic axes of the sub-regions 11b, 12b, 13b, 14b and the sub-regions 11d, 12d, 13d, 14d in FIG. 2 are set to a direction of the y-axis in FIG. 2. The phase difference between the polarized light component in a direction parallel to the optic axis and the polarized light component in a direction perpendicular to the optic axis increases in the order of the sub-regions 11a through 11d, the sub-regions 12a through 12d, the sub-regions 13a through 13d and the sub-regions 14a through 14d.

The second embodiment of optical head device according to the invention differs from the first embodiment only in that the birefringence correcting element 5a of the first embodiment is replaced by a birefringence correcting element 5b. Otherwise, the second embodiment has the same configuration as that of the first embodiment illustrated in FIG. 1.

FIG. 3 is a schematic plan view of the birefringence correcting element 5b. The birefringence correcting element 5b is circumferentially divided into four regions that extend toward the outer periphery by two straight lines passing through the optical axis and spaced apart from each other by an angular space of 90°. Each of the regions is radially divided into four regions, or sub-regions, by three coaxial circles centered at the optical axis. In FIG. 3, the circle of a dotted line indicates the effective area of the objective lens 6. The birefringence correcting element 5b contains a material that shows mono-axial refractive index anisotropy. The arrows in FIG. 3 indicate the directions of the respective optic axes of the four regions.

The direction of the optic axes of the sub-regions 15a, 16a, 17a, 18a located at the right side and the sub-regions 15c, 16c, 17c, 18c located at the left side in FIG. 3 are set to a direction of angle 90° relative to the x-axis in FIG. 3. The direction of the optic axes of the sub-regions 15b, 16b, 17b, 18b located at the top side and the sub-regions 15d, 16d, 17d, 18d located at the bottom side in FIG. 3 are set to a direction of angle 0° relative to the x-axis in FIG. 3. The phase difference between the polarized light component in a direction parallel to the optic axis and the polarized light component in a direction perpendicular to the optic axis shows the following values. It is equal to 0° in the sub-regions 15a, 15b, 15c, 15d located closest to the center and equal to 18° in the sub-regions 16a, 16b, 16c, 16d located immediately outside the above sub-regions, whereas it is equal to 36° in the sub-regions 17a, 17b, 17c, 17d located immediately outside the sub-regions that are second-closest to the center and equal to 54° in the outermost sub-regions 18a, 18b, 18c, 18d.

The third embodiment of optical head device according to the invention differs from the first embodiment only in that the birefringence correcting element 5a of the first embodiment is replaced by a birefringence correcting element 5c. Otherwise, the third embodiment has the same configuration as that of the first embodiment illustrated in FIG. 1.

Figure 4:
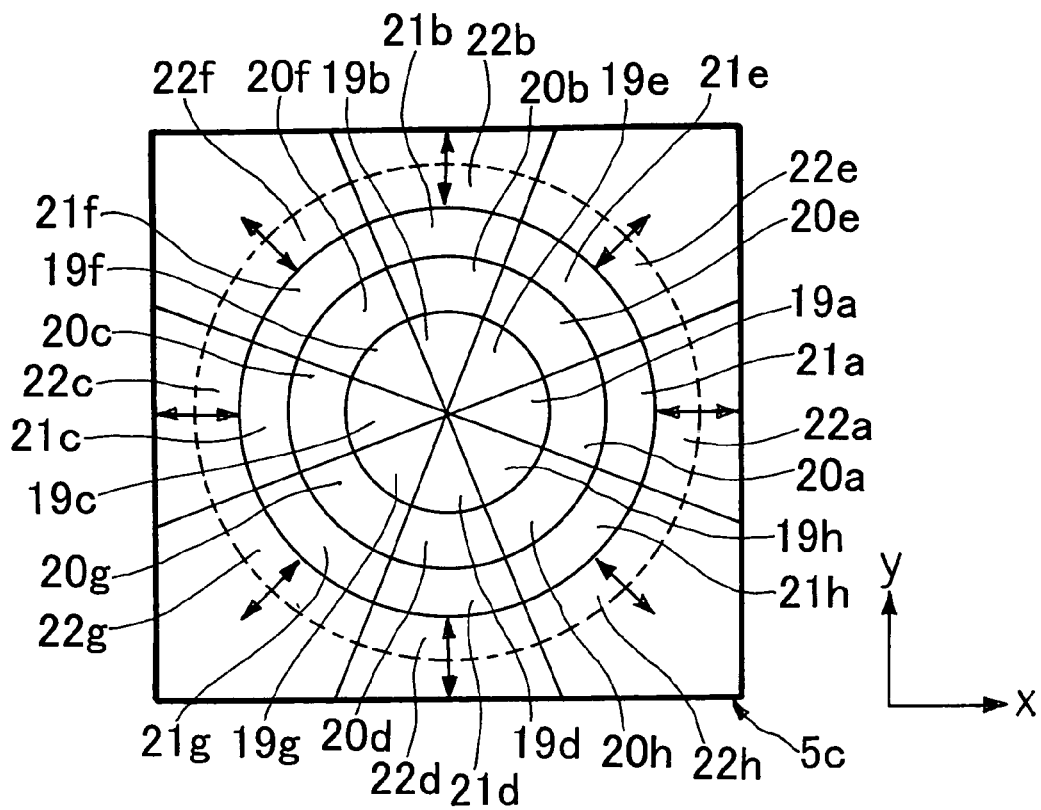
FIG. 4 is a schematic plan view of the birefringence correcting element of a third embodiment of optical head device according to the invention.

FIG. 4 is a schematic plan view of the birefringence correcting element 5c. The birefringence correcting element 5c is circumferentially divided into eight regions that extend toward the outer periphery by four straight lines passing through the optical axis and spaced apart from each other by an angular space of 45°. Each of the regions is radially divided into four regions, or sub-regions, by three coaxial circles centered at the optical axis. In FIG. 4, the circle of a dotted line indicates the effective area of the objective lens 6. The birefringence correcting element 5c contains a material that shows mono-axial refractive index anisotropy. The arrows in FIG. 4 indicate the directions of the respective optic axes of the eight regions.

The direction of the optic axes of the sub-regions 19a, 20a, 21a, 22a located at the right side and the sub-regions 19c, 20c, 21c, 22c located at the left side in FIG. 4 are set to a direction of angle 0° relative to the x-axis in FIG. 4. The direction of the optic axes of the sub-regions 19b, 20b, 21b, 22b located at the top side and the sub-regions 19d, 20d, 21d, 22d located at the bottom side in FIG. 4 are set to a direction of angle 90° relative to the x-axis in FIG. 4. The direction of the optic axes of the sub-regions 19e, 20e, 21e, 22e located at the upper right side and the sub-regions 19g, 20g, 21g, 22g located at the lower left side in FIG. 4 are set to a direction of angle 45° relative to the x-axis in FIG. 4. The direction of the optic axes of the sub-regions 19f, 20f, 21f, 22f located at the upper left side and the sub-regions 19h, 20h, 21h, 22h located at the lower right side in FIG. 4 are set to a direction of angle 135° relative to the x-axis in FIG. 4. The phase difference between the polarized light component in a direction parallel to the optic axis and the polarized light component in a direction perpendicular to the optic axis shows the following values. It is equal to 0° in the sub-regions 19a, 19b, 19c, 19d, 19e, 19f, 19g, 19h located closest to the center and equal to 18° in the sub-regions 20a, 20b, 20c, 20d, 20e, 20f, 20g, 20h located immediately outside the above sub-regions, whereas it is equal to 36° in the sub-regions 21a, 21b, 21c, 21d, 21e, 21f, 21g, 21h located immediately outside the sub-regions that are second-closest to the center and equal to 54° in the outermost sub-regions 22a, 22b, 22c, 22d, 22e, 22f, 22g, 22h.

The fourth embodiment of optical head device according to the invention differs from the first embodiment only in that the birefringence correcting element 5a of the first embodiment is replaced by a birefringence correcting element 5d. Otherwise, the fourth embodiment has the same configuration as that of the first embodiment illustrated in FIG. 1.

Figure 5:
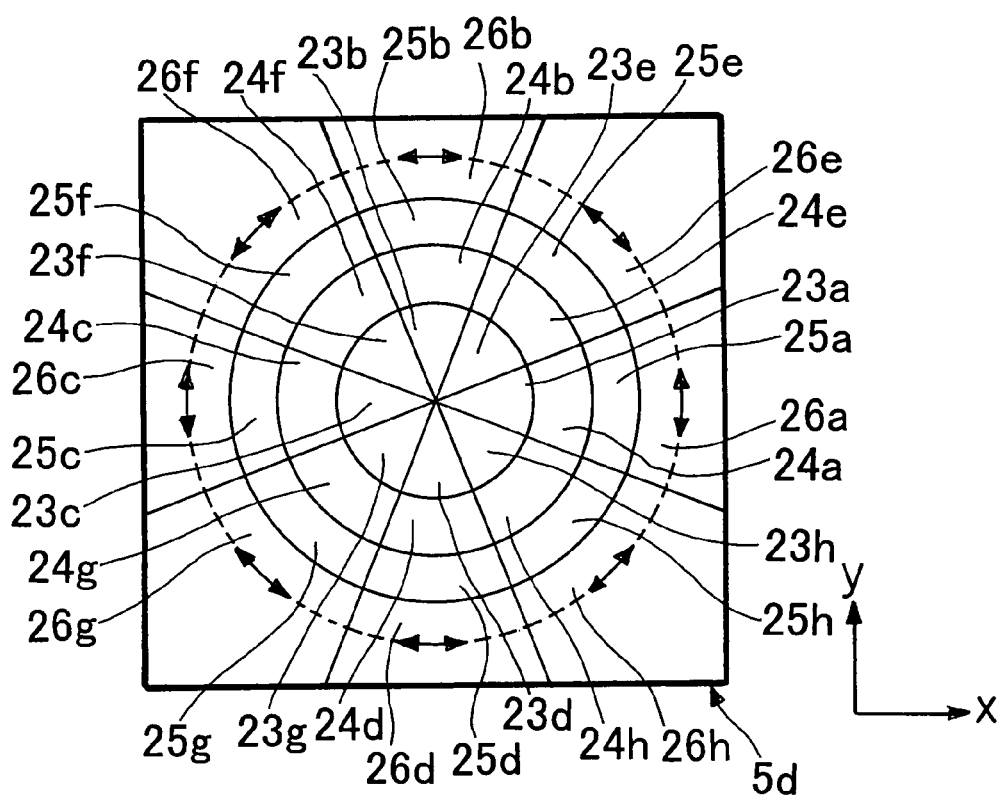
FIG. 5 is a schematic plan view of the birefringence correcting element of a fourth embodiment of optical head device according to the invention.

FIG. 5 is a schematic plan view of the birefringence correcting element 5d. The birefringence correcting element 5d is circumferentially divided into eight regions that extend toward the outer periphery by four straight lines passing through the optical axis and spaced apart from each other by an angular space of 45°. Each of the regions is radially divided into four regions, or sub-regions, by three coaxial circles centered at the optical axis. In FIG. 5, the circle of a dotted line indicates the effective area of the objective lens 6. The birefringence correcting element 5d contains a material that shows mono-axial refractive index anisotropy. The arrows in FIG. 5 indicate the directions of the respective optic axes of the eight regions.

The direction of the optic axes of the sub-regions 23a, 24a, 25a, 26a located at the right side and the sub-regions 23c, 24c, 25c, 26c located at the left side in FIG. 5 are set to a direction of angle 90° relative to the x-axis in FIG. 5. The direction of the optic axes of the sub-regions 23b, 24b, 25b, 26b located at the top side and the sub-regions 23d, 24d, 25d, 26d located at the bottom side in FIG. 5 are set to a direction of angle 0° relative to the x-axis in FIG. 5. The direction of the optic axes of the sub-regions 23e, 24e, 25e, 26e located at the upper right side and the sub-regions 23g, 24g, 25g, 26g located at the lower left side in FIG. 5 are set to a direction of angle 135° relative to the x-axis in FIG. 5. The direction of the optic axes of the sub-regions 23f, 24f, 25f, 26f located at the upper left side and the sub-regions 23h, 24h, 25h, 26h located at the lower right side in FIG. 5 are set to a direction of angle 45° relative to the x-axis in FIG. 5. The phase difference between the polarized light component in a direction parallel to the optic axis and the polarized light component in a direction perpendicular to the optic axis shows the following values. It is equal to 0° in the sub-regions 23a, 23b, 23c, 23d, 23e, 23f, 23g, 23h located closest to the center and equal to 18° in the sub-regions 24a, 24b, 24c, 24d, 24e, 24f, 24g, 24h located immediately outside the above sub-regions, whereas it is equal to 36° in the sub-regions 25a, 25b, 25c, 25d, 25e, 25f, 25g, 25h located immediately outside the sub-regions that are second-closest to the center and equal to 54° in the outermost sub-regions 26a, 26b, 26c, 26d, 26e, 26f, 26g, 26h.

Figure 15A:
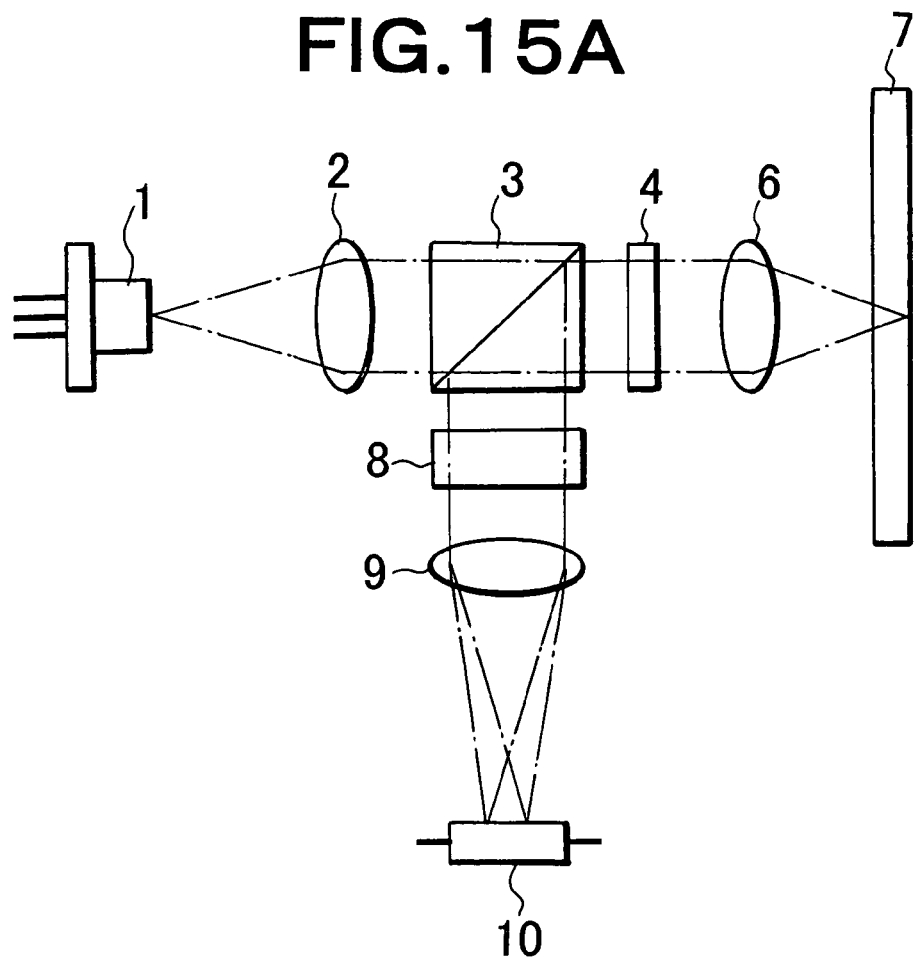
FIG. 15A is a schematic diagram of a known popular optical head device.
Figure 15B:
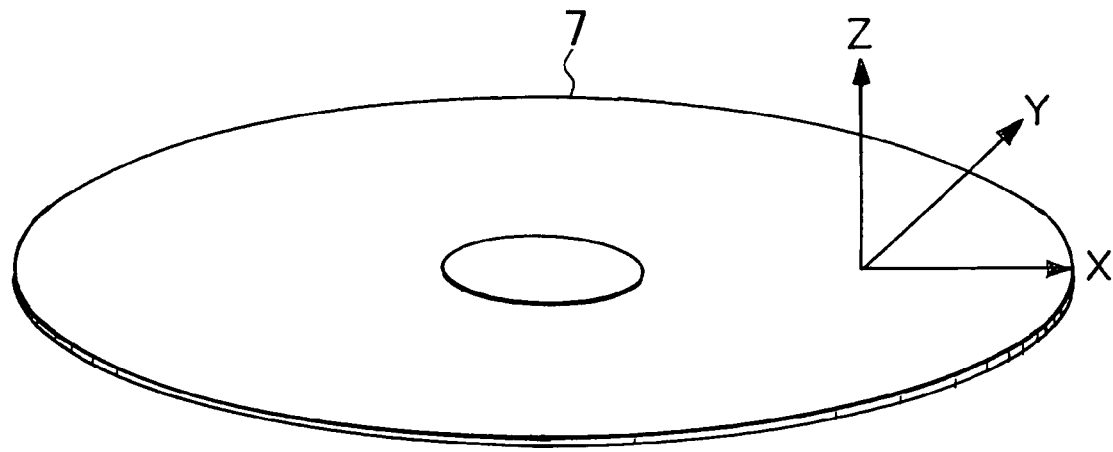
FIG. 15B is a schematic perspective view of an optical recording medium showing the relationship with an XYZ coordinate system thereof.

Now, a method of designing a birefringence correcting element according to the invention will be described below. When an X-axis and a Y-axis are defined in a plane perpendicular to the optical axis of incident light or reflected light on or from an optical disk 7 as shown in FIG. 15B and the Jones matrix of the protection layer of the optical disk 7 illustrated in FIG. 1 is S, S is expressed by the mathematical formula shown below.

$$S = \begin{pmatrix} \cos(\theta+\phi) & -\sin(\theta+\phi) \\ \sin(\theta+\phi) & \cos(\theta+\phi) \end{pmatrix} \quad \text{[formula 1]}$$

$$\begin{pmatrix} \exp(i\frac{\alpha}{2}) & 0 \\ 0 & \exp(-i\frac{\alpha}{2}) \end{pmatrix} \begin{pmatrix} \cos(\theta+\phi) & \sin(\theta+\phi) \\ -\sin(\theta+\phi) & \cos(\theta+\phi) \end{pmatrix}$$

where ø is expressed by the formula below.

$$\phi = \tan^{-1}\frac{y}{x} \quad \text{[formula 2]}$$

Let us imagine an ellipse that is a cross section of the ellipsoid of refractive index of the protection layer of the disk 7 taken in a direction perpendicular to the rays of light. Then, α is the phase difference between the polarized light component in the direction of the major axis and the polarized light component in the direction of the minor axis of the ellipse and θ is the angle of the direction of the major axis or the minor axis of the ellipse. The value of α and that of θ can be determined by the method described in the above-cited Non-Patent Document 1.

If the Jones matrix of the birefringence correcting element is B, it is sufficient for B to be the inverse matrix of S when there is no intra-plane birefringence in order to correct the influence of the vertical birefringence of the protection layer of the disk 7 on incident light or reflected light by means of the birefringence correcting element. Then, the birefringence correcting element is a wave plate whose direction of optic axis is defined by θ+ø and whose phase difference between the polarized light component in a direction parallel to the optic axis and the polarized light component in a direction perpendicular to the optic axis is defined by α. However, since both θ+ø and α are functions of x and y, both the direction of the optic axis and the phase difference vary depending on the intra-plane position of the birefringence correcting element. Then, as a result, the phase difference that is produced when light is transmitted through the protection layer of the disk 7 is offset by the phase difference that is produced when light is transmitted through the birefringence correcting element.

It will be computationally found that the direction of the above optic axis agrees with a radial direction or a tangential direction of a circle that is rotationally symmetric relative to the optical axis and centered at the optical axis. In other words, the direction of the optic axis continuously changes as a function of the angle relative to the x-axis in FIGS. 2 through 5. In actual applications, the direction of the optic axis may be made to change discretely instead of being made to change continuously. The birefringence correcting element can be prepared with ease when the direction of the optic axis is made to change discretely, although the effect of correcting the influence of the vertical birefringence on incident light or reflected light is reduced slightly.

The birefringence correcting element 5a illustrated in FIG. 2 is circumferentially divided into four regions that extend toward the outer periphery so that the direction of the optic axis is made to change discretely relative to the x-axis. The direction of the optic axis agrees with a radial direction of a circle centered at the optical axis in circumferentially central parts of the sub-regions 11a, 12a, 13a, 14a between the dividing lines therefor, in circumferentially central parts of the sub-regions 11b, 12b, 13b, 14b between the dividing lines therefor, in circumferentially central parts of the sub-regions 11c, 12c, 13c, 14c between the dividing lines therefor and also in circumferentially central parts of the sub-regions 11d, 12d, 13d, 14d between the dividing lines therefor. However, the direction of the optic axis is displaced from the radial direction of the circle in the parts located away from the central parts and close to the dividing lines, or the boundary lines, separating adjacent groups of sub-regions.

The birefringence correcting element 5b illustrated in FIG. 3 is circumferentially divided into four regions that extend toward the outer periphery so that the direction of the optic axis is made to change discretely relative to the x-axis. The direction of the optic axis agrees with a tangential direction of a circle centered at the optical axis in circumferentially central parts of the sub-regions 15a, 16a, 17a, 18a between the dividing lines therefor, in circumferentially central parts of the sub-regions 15b, 16b, 17b, 18b between the dividing lines therefor, in circumferentially central parts of the sub-regions 15c, 16c, 17c, 18c between the dividing lines therefor and also in circumferentially central parts of the sub-regions 15d, 16d, 17d, 18d between the dividing lines therefor. However, the direction of the optic axis is displaced from the tangential direction of the circle in the parts located away from the central parts and close to the dividing lines, or the boundary lines, separating adjacent groups of sub-regions.

The birefringence correcting element 5c illustrated in FIG. 4 is circumferentially divided into eight regions that extend toward the outer periphery so that the direction of the optic axis is made to change discretely relative to the x-axis. The direction of the optic axis agrees with a radial direction of a circle centered at the optical axis in circumferentially central parts of the sub-regions 19a, 20a, 21a, 22a between the dividing lines therefor, in circumferentially central parts of the sub-regions 19b, 20b, 21b, 22b between the dividing lines therefor, in circumferentially central parts of the sub-regions 19c, 20c, 21c, 22c between the dividing lines therefor, in circumferentially central parts of the sub-regions 19d, 20d, 21d, 22d between the dividing lines therefor, in circumferentially central parts of the sub-regions 19e, 20e, 21e, 22e between the dividing lines therefor, in circumferentially central parts of the sub-regions 19f, 20f, 21f, 22f between the dividing lines therefor, in circumferentially central parts of the sub-regions 19g, 20g, 21g, 22g between the dividing lines therefor and also in circumferentially central parts of the sub-regions 19h, 20h, 21h, 22h between the dividing lines therefor. However, the direction of the optic axis is displaced from the radial direction of the circle in the parts located away from the central parts and close to the dividing lines, or the boundary lines, separating adjacent groups of sub-regions.

The birefringence correcting element 5d illustrated in FIG. 5 is circumferentially divided into eight regions that extend toward the outer periphery so that the direction of the optic axis is made to change discretely relative to the x-axis. The direction of the optic axis agrees with a tangential-direction of a circle centered at the optical axis in circumferentially central parts of the sub-regions 23a, 24a, 25a, 26a between the dividing lines therefor, in circumferentially central parts of the sub-regions 23b, 24b, 25b, 26b between the dividing lines therefor, in circumferentially central parts of the sub-regions 23c, 24c, 25c, 26c between the dividing lines therefor, in circumferentially central parts of the sub-regions 23d, 24d, 25d, 26d between the dividing lines therefor, in circumferentially central parts of the sub-regions 23e, 24e, 25e, 26e between the dividing lines therefor, in circumferentially central parts of the sub-regions 23f, 24f, 25f, 26f between the dividing lines therefor, in circumferentially central parts of the sub-regions 23g, 24g, 25g, 26g between the dividing lines therefor and also in circumferentially central parts of the sub-regions 23h, 24h, 25h, 26h between the dividing lines therefor. However, the direction of the optic axis is displaced from the tangential direction of the circle in the parts located away from the central parts and close to the dividing lines, or the boundary lines, separating adjacent groups of sub-regions.

Figure 6:
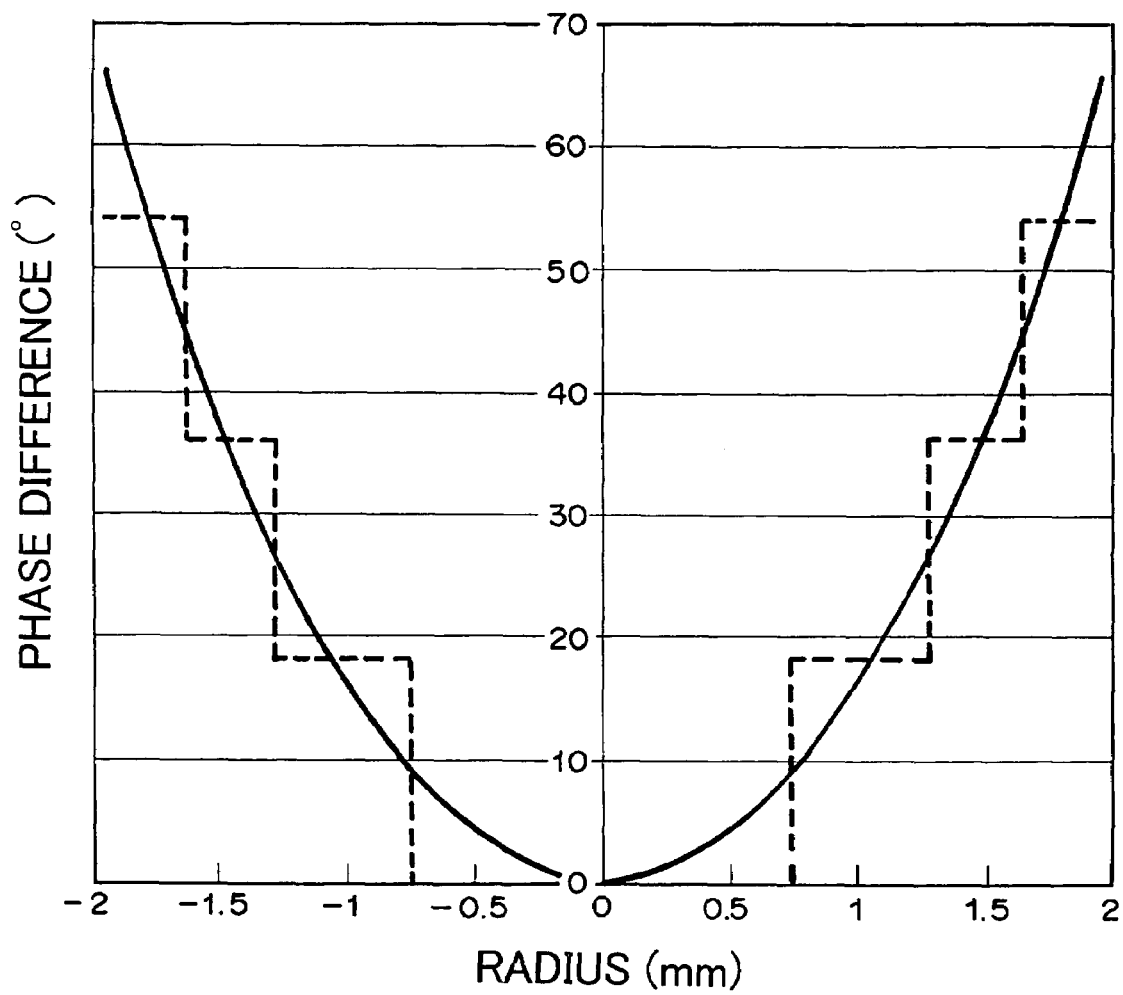
FIG. 6 is a graph illustrating the computationally determined phase difference between the polarized light component in a direction parallel to the optic axis and the polarized light component in a direction perpendicular to the optic axis of a birefringence correcting element that can be used for the purpose of the present invention.

On the other hand, it will be computationally found that the phase difference between the polarized light component polarized in a direction parallel to the optic axis and the polarized light component polarized in a direction perpendicular to the optic axis is rotationally symmetric relative to the optical axis and monotonously increase along a radial direction of a circle centered at the optical axis from the inside toward the out side of the circle. FIG. 6 is a graph illustrating the computationally determined phase difference between the polarized light component in a direction parallel to the optic axis and the polarized light component in a direction perpendicular to the optic axis of a birefringence correcting element that can be used for the purpose of the present invention. The graph is obtained on an assumption that the wavelength of light from the light source is 405 nm and the numerical aperture of the objective lens is 0.65 while the protection layer of the optical recording medium is 0.6 mm thick and the vertical birefringence of the protection layer of the optical recording medium is 0.0007. Since the focal length of the objective lens is 3 mm, the effective radius of the objective lens is 3 mm×0.65=1.95 mm. As shown by the solid line in FIG. 6, the phase difference changes continuously as a quadratic function of the distance from the optical axis. In actual applications, the phase difference may be made to change discretely instead of being made to change continuously. The birefringence correcting element can be prepared with ease when the phase difference is made to change discretely, although the effect of correcting the influence of the vertical birefringence on incident light or reflected light is reduced slightly.

Each of the birefringence correcting elements 5a through 5d illustrated in FIGS. 2 through 5 is radially divided into four regions so that the phase difference is made to change discretely as a function of the distance from the optical axis as indicated by the broken lines in FIG. 6. The phase difference is equal to 0° in the sub-regions 11a through lid, 15a through 15d, 19a through 19h and 23a through 23h, equal to 18° in the sub-regions 12a through 12d, 16a through 16d, 20a through 20h and 24a through 24h, equal to 36° in the sub-regions 13a through 13d, 17a through 17d, 21a through 21h and 25a through 25h and equal to 54° in the sub-regions 14a through 14d, 18a through 18d, 22a through 22h and 26a through 26h. The radius is 0.75 mm at the boundary between the sub-regions where the phase difference is equal to 0° and the sub-regions where the phase difference is equal to 18° and the radius is 1.28 mm at the boundary between the sub-regions where the phase difference is equal to 18° and the sub-regions where the phase difference is equal to 36°, while the radius is 1.64 mm at the boundary between the sub-regions where the phase difference is equal to 36° and the sub-regions where the phase difference is equal to 54°.

FIGS. 7A through 7D are schematic cross sectional views of the birefringence correcting element 5a. The birefringence correcting element 5a is formed by arranging masses of liquid crystal polymers 28a through 28d showing mono-axial refractive index anisotropy between a pair of glass substrates 27a and 27b. The arrows in FIGS. 7A through 7D indicate the longitudinal directions of the liquid crystal polymers 28a through 28d. The direction of the optic axis of the birefringence correcting element 5a is defined by the projections of the longitudinal directions of the masses of liquid crystal polymers 28a through 28d on a plane of the birefringence correcting element 5a. The phase difference of the birefringence correcting element 5a is defined by the angles between the longitudinal directions of the masses of liquid crystal polymers 28a through 28d and the plane of the birefringence correcting element 5a. The smaller the angles between the longitudinal directions of the masses of liquid crystal polymer 28a through 28d and the plane of the birefringence correcting element 5a, the greater the phase difference. FIGS. 7A through 7D correspond to phase differences of 0°, 18°, 36° and 54° respectively.

The projections of the longitudinal directions of the masses of liquid crystal polymers 28a through 28d on the plane of the birefringence correcting element 5a are uniformly made to show a predetermined state so that the direction of the optic axis may be equal to 0° relative to the x-axis in the sub-regions 11a, 12a, 13a, 14a, and in the sub-regions 11c, 12c, 13c, 14c. The projections of the longitudinal directions of the masses of liquid crystal polymers 28a through 28d on the plane of the birefringence correcting element 5a are uniformly made to show a predetermined state so that the direction of the optic axis may be equal to 90° relative to the x-axis in the sub-regions 11b, 12b, 13b, 14b, and in the sub-regions 11d, 12d, 13d, 14d.

Figure 7A:
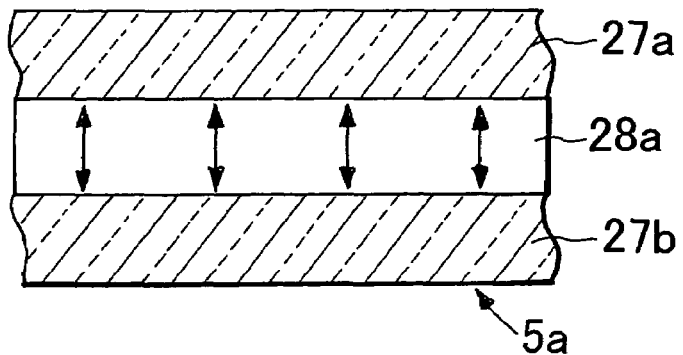
FIGS. 7A through 7D are schematic cross sectional views of the birefringence correcting element of the first embodiment of optical head device according to the invention.
Figure 7B:
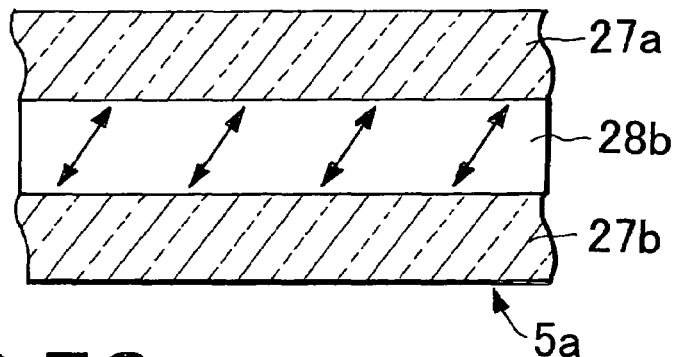
Figure 7C:
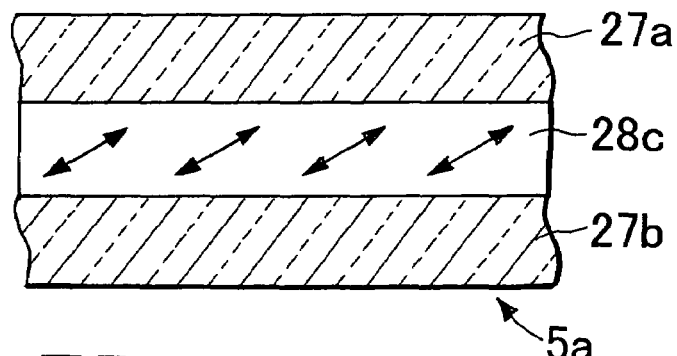
Figure 7D:
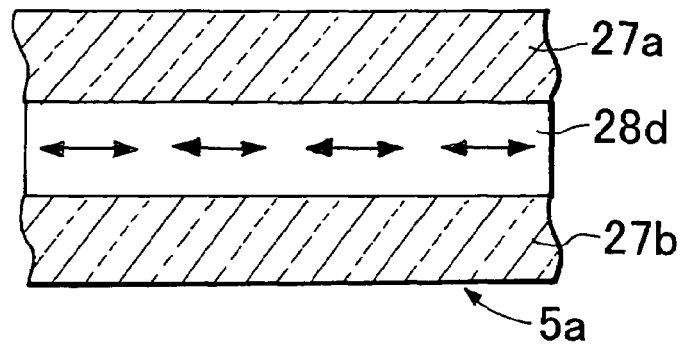

The angle between the longitudinal direction of the mass of liquid crystal polymer 28a and the plane of the birefringence correcting element 5a is uniformly made to show a predetermined state as shown in FIG. 7A so that the phase difference may be equal to 0° in the sub-regions 11a, 11b, 11c, 11d of the birefringence correcting element 5a. The angle between the longitudinal direction of the mass of liquid crystal polymer 28b and the plane of the birefringence correcting element 5a is uniformly made to show a predetermined state as shown in FIG. 7B so that the phase difference may be equal to 18° in the sub-regions 12a, 12b, 12c, 12d of the birefringence correcting element 5a. The angle between the longitudinal direction of the mass of liquid crystal polymer 28c and the plane of the birefringence correcting element 5a is uniformly made to show a predetermined state as shown in FIG. 7C so that the phase difference may be equal to 36° in the sub-regions 13a, 13b, 13c, 13d of the birefringence correcting element 5a. The angle between the longitudinal direction of the mass of liquid crystal polymer 28d and the plane of the birefringence correcting element 5a is uniformly made to show a predetermined state as shown in FIG. 7D so that the phase difference may be equal to 54° in the sub-regions 14a, 14b, 14c, 14d of the birefringence correcting element 5a.

The longitudinal directions of the masses of liquid crystal polymers 28a through 28d can be uniformly made to show a predetermined state by using an orientation film subjected to a rubbing process, by selecting an appropriate liquid crystal material and/or by adjusting the voltage applied to the liquid crystal.

The birefringence correcting elements 5b through 5d also show a cross sectional views as shown in FIGS. 7A through 7D. Either to select an approximately radial direction of a circle centered at the optical axis, as in the cases of the elements 5a and 5c, as the direction of the optic axis of the birefringence correcting element or select an approximately tangential direction of a circle centered at the optical axis, as in the cases of the elements 5b and 5d, as the direction of the optic axis of the birefringence correcting element is determined depending on the sign of the formula of (nx+ny)/2−nz as described above by referring to FIG. 15B and if the masses of liquid crystal polymers 28a through 28d have the properties of positive crystal or those of negative crystal.

Now, the diameter of the spot of converged light formed on the optical recording medium and the light receiving rate of the photo-detector will be described below. Assume here that the direction of P-polarization and the direction of S-polarization relative to the polarization beam splitter 3 of FIG. 1 respectively correspond to the direction of the X-axis and the direction of the Y-axis in FIG. 15B. Also assume here that the direction of polarization of light emitted from the semiconductor laser 1 in FIG. 1 agrees with the direction of P-polarized light relative to the polarization beam splitter 3. If the electric field distribution of light emitted from the semiconductor laser 1 is $E_0(x, y)$ and the Jones matrix of the ¼ wave plate 4 of FIG. 1 is Q, the electric field distribution of light after passing through the ¼ wave plate 4, the birefringence correcting element and the protection layer of the disk 7 on the forward path from the semiconductor laser 1 to the disk 7 of FIG. 1 can be expressed by the mathematical formula below, using Jones vectors.

$$\begin{bmatrix} E_{pi}(x, y) \\ E_{si}(x, y) \end{bmatrix} = S \cdot B \cdot Q \cdot \begin{bmatrix} E_0(x, y) \\ 0 \end{bmatrix} \quad \text{[formula 3]}$$

where Q is given by the formula below.

$$Q = \frac{1}{\sqrt{2}} \begin{pmatrix} 1 & -i \\ -i & 1 \end{pmatrix} \quad \text{[formula 4]}$$

A U-axis and a V-axis are defined respectively in parallel with the X-axis and the Y-axis in FIG. 15B in the near field on the disk 7 in FIG. 1. If the wavelength of the semiconductor laser 1 of FIG. 1 is λ and the focal length of the objective lens 6 of FIG. 1 is f, the electric distribution of the spot of converged light formed on the disk 7 is expressed by the mathematical formula below, using Jones vectors.

$$\begin{pmatrix} e_{pi}(u, v) \\ e_{si}(u, v) \end{pmatrix} \propto \int\int \begin{pmatrix} E_{pi}(x, y) \\ E_{si}(x, y) \end{pmatrix} \exp\left(-\frac{2\pi i(xu + yv)}{\lambda f}\right) dx dy \quad \text{[formula 5]}$$

The intensity distribution of the spot of converged light is expressed by the mathematical formula below.

$$I(u, v) = |e_{pi}(u, v)|^2 + |e_{si}(u, v)|^2 \quad \text{[formula 6]}$$

Thus, it is possible to computationally determine the relationship between the birefringence of the protection layer of the optical recording medium and the diameter of the spot of converged light according to the above formula.

If the complex reflectivity distribution of the disk 7 is R(u, v), the electric field distribution of light reflected from the disk 7 is expressed by the mathematical formula below, using Jones vectors.

$$\begin{pmatrix} E_{pr}(u, v) \\ E_{sr}(u, v) \end{pmatrix} \propto \int\int \begin{pmatrix} e_{pi}(x, y) \\ e_{si}(x, y) \end{pmatrix} R(u, v) \exp\left(\frac{2\pi i(xu + yv)}{\lambda f}\right) du dv \quad \text{[formula 7]}$$

where R(u, v) is a function that is determined by the profile of the pits formed on the disk 7.

The electric field distribution of light after passing through the protection layer of the disk 7, the birefringence correcting element and the ¼ wave plate 4 on the backward path from the disk 7 to the photo-detector 10 can be expressed by the mathematical formula below, using Jones vectors.

$$\begin{bmatrix} E_p(x, y) \\ E_s(x, y) \end{bmatrix} = Q^* \cdot B^* \cdot S^* \cdot \begin{bmatrix} E^*_{pr}(-x, -y) \\ E^*_{sr}(-x, -y) \end{bmatrix} \quad \text{[formula 8]}$$

If the light receiving rate of the photo-detector 10 is L, L is expressed by the mathematical formula below.

$$L \propto \int\int |E_s(x, y)|^2 dxdy \quad \text{[formula 9]}$$

It is possible to computationally determine the relationship between the birefringence of the protection layer of the optical recording medium and the resolution and the crosstalk of the reproduced signal according to the above formula.

FIG. 8 is a graph illustrating the computationally determined relationship between the intra-plane birefringence of the protection layer of an optical recording medium and the diameter of the spot of converged light formed on the optical recording medium on an assumption that the wavelength of light from the light source is 405 nm and the numerical aperture of the objective lens 0.65 while the protection layer of the optical recording medium is 0.6 mm thick. In FIG. 8, ● indicates the computationally determined values that are obtained when the vertical birefringence is equal to 0 and ○ indicates the computationally determined values that are obtained when the vertical birefringence is equal to 0.0007 and not corrected by means of a birefringence correcting element, whereas Δ indicates the computationally determined values that are obtained when the vertical birefringence is equal to 0.0007 and corrected by means of a birefringence correcting element 5a or a birefringence correcting element 5b circumferentially divided into four regions as illustrated respectively in FIGS. 2 and 3 and □ indicates the computationally determined values that are obtained when the vertical birefringence is equal to 0.0007 and corrected by means of a birefringence correcting element 5c or a birefringence correcting element 5d circumferentially divided into eight regions as illustrated respectively in FIGS. 4 and 5.

As seen from FIG. 8, the diameter of the spot of converged light does not depend on the intra-plane birefringence and is about 0.523 μm when the vertical birefringence is equal to 0. However, the diameter of the spot of converged light depends slightly on the intra-plane birefringence and is enlarged to about 0.540 μm at the intra-plane birefringence of 0 when the vertical birefringence is equal to 0.0007 and not corrected by means of a birefringence correcting element. On the other hand, the diameter of the spot of converged light scarcely depends on the intra-plane birefringence and is equal to about 0.530 μm when the vertical birefringence is 0.0007 and the birefringence is corrected by means of a birefringence correcting element that is circumferentially divided into four regions that extend toward the outer periphery. Additionally, the diameter of the spot of converged light scarcely depends on the intra-plane birefringence and is equal to about 0.524 μm when the vertical birefringence is 0.0007 and the birefringence is corrected by means of a birefringence correcting element that is circumferentially divided into eight regions that extend toward the outer periphery.

From the above, it will be appreciated that the enlargement of the diameter of the spot of converged light due to vertical birefringence can be suppressed by means of a birefringence correcting element. The effect of suppressing the diameter of the spot of converged light is greater when a birefringence correcting element that is circumferentially divided into eight regions that extend toward the outer periphery is used than when a birefringence correcting element that is circumferentially divided into four regions that extend toward the outer peripheryis used. The former birefringence correcting element can substantially perfectly suppress the enlargement of the diameter of the spot of converged light.

The intra-plane birefringence of the protection layer of an optical recording medium varies according to a radial position of the optical recording medium, and it varies within a range of about ±0.00003 when polycarbonate is used for the protection layer. In other words, when a birefringence correcting element is not used for correcting the birefringence, the diameter of the spot of converged light varies depending on the radial position. It is an undesirable phenomenon for performing recording/reproducing operations. However, such variances of the diameter of the spot of converged light that depend on the radial position of the optical recording medium can be suppressed by means of a birefringence correcting element.

Figure 9:
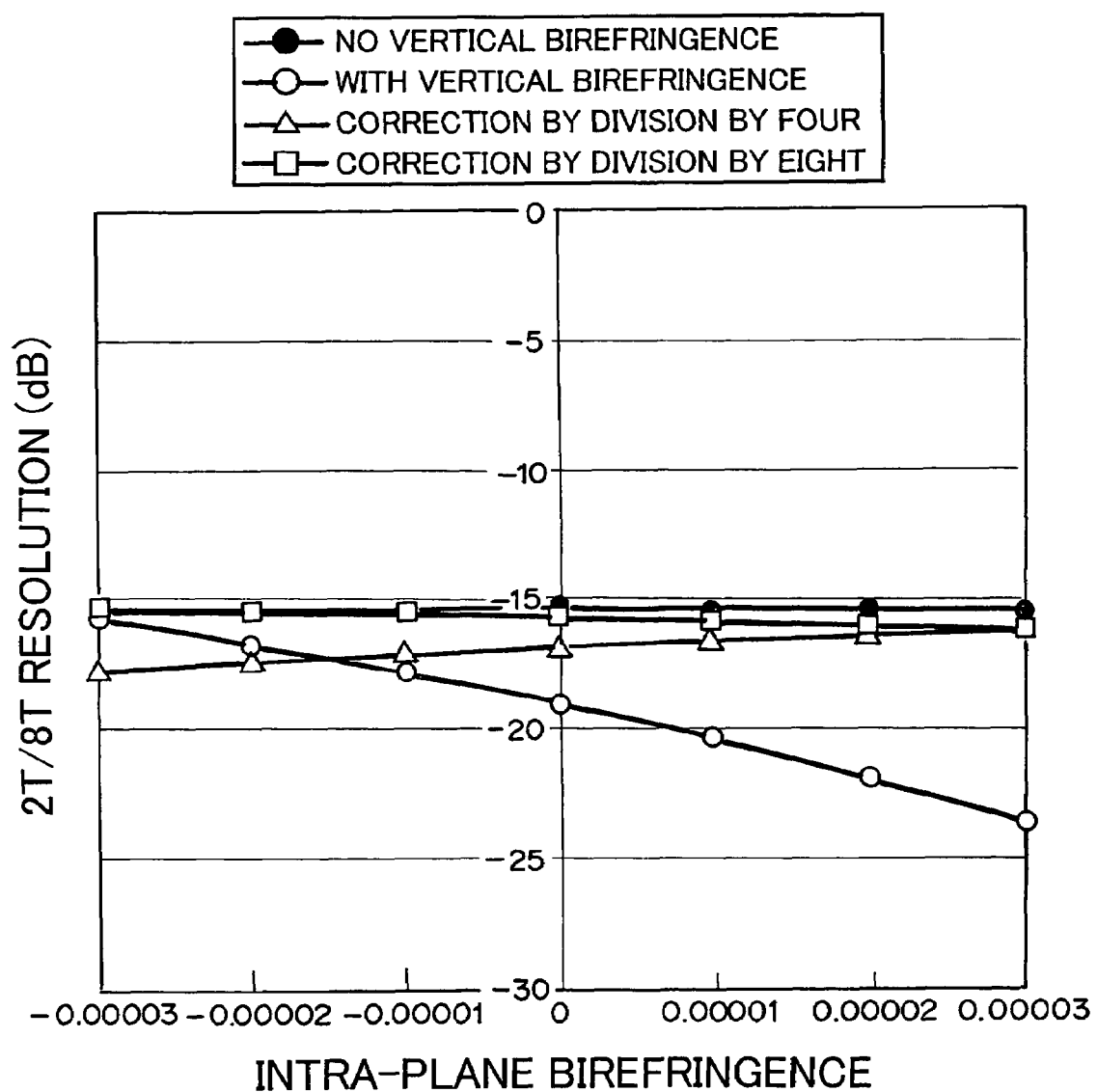
FIG. 9 is a graph illustrating the computationally determined relationship between the intra-plane birefringence of the protection layer of an optical recording medium and the resolution of a reproduced signal.

FIG. 9 is a graph illustrating the computationally determined relationship between the intra-plane birefringence of the protection layer of an optical recording medium and the resolution of a reproduced signal on an assumption that the shortest pit (which corresponds to 2T of 1-7 modulation) is 0.205 μm long and the longest pit (which corresponds to 8T of 1-7 modulation) is 0.820 μm long out of the pits formed on the optical recording medium, while the track pitch is 0.4 μm, in addition to the assumptions described above for FIG. 8. The 2T/8T resolution of the vertical axis in FIG. 9 is defined by the ratio of the carrier level of a 2T signal and that of an 8T signal. In FIG. 9, ● indicates the computationally determined values that are obtained when the vertical birefringence is equal to 0and ○ indicates the computationally determined values that are obtained when the vertical birefringence is equal to 0.0007 and not corrected by means of a birefringence correcting element, whereas Δ indicates the computationally determined values that are obtained when the vertical birefringence is equal to 0.0007 and corrected by means of a birefringence correcting element 5a or the birefringence correcting element 5b circumferentially divided into four regions as illustrated respectively in FIGS. 2 and 3 and □ indicates the computationally determined values that are obtained when the vertical birefringence is equal to 0.0007 and corrected by means of a birefringence correcting element 5c or a birefringence correcting element 5d circumferentially divided into eight regions as illustrated respectively in FIGS. 4 and 5.

As seen from FIG. 9, the 2T/8T resolution does not depend on the intra-plane birefringence and is about −15.4 dB when the vertical birefringence is equal to 0. However, the 2T/8T resolution depends largely on the intra-plane birefringence and is reduced to about −19.0 dB at the intra-plane birefringence of 0 when the vertical birefringence is equal to 0.0007 and not corrected by means of a birefringence correction element. On the other hand, the 2T/8T resolution slightly depends on the intra-plane birefringence and is equal to about −16.8 dB when the vertical birefringence is 0.0007 and the birefringence is corrected by means of a birefringence correcting element that is circumferentially divided into four regions. Additionally, the 2T/8T resolution scarcely depends on the intra-plane birefringence and is equal to about −15.7 dB when the vertical birefringence is 0.0007 and the birefringence is corrected by means of a birefringence correcting element that is circumferentially divided into eight regions.

From the above, it will be appreciated that the fall of the resolution of the reproduced signal due to vertical birefringence can be suppressed by means of a birefringence correcting element. The effect of suppressing the fall of the resolution of the reproduced signal is greater when a birefringence correcting element that is circumferentially divided into eight regions is used than when a birefringence correcting element that is circumferentially divided into four regions is used. The former birefringence correcting element can substantially perfectly suppress the fall of the resolution of the reproduced signal. Additionally, the variances of the resolution of the reproduced signal that depend on the radial position of the optical recording medium can be suppressed by means of a birefringence correcting element.

Figure 10:
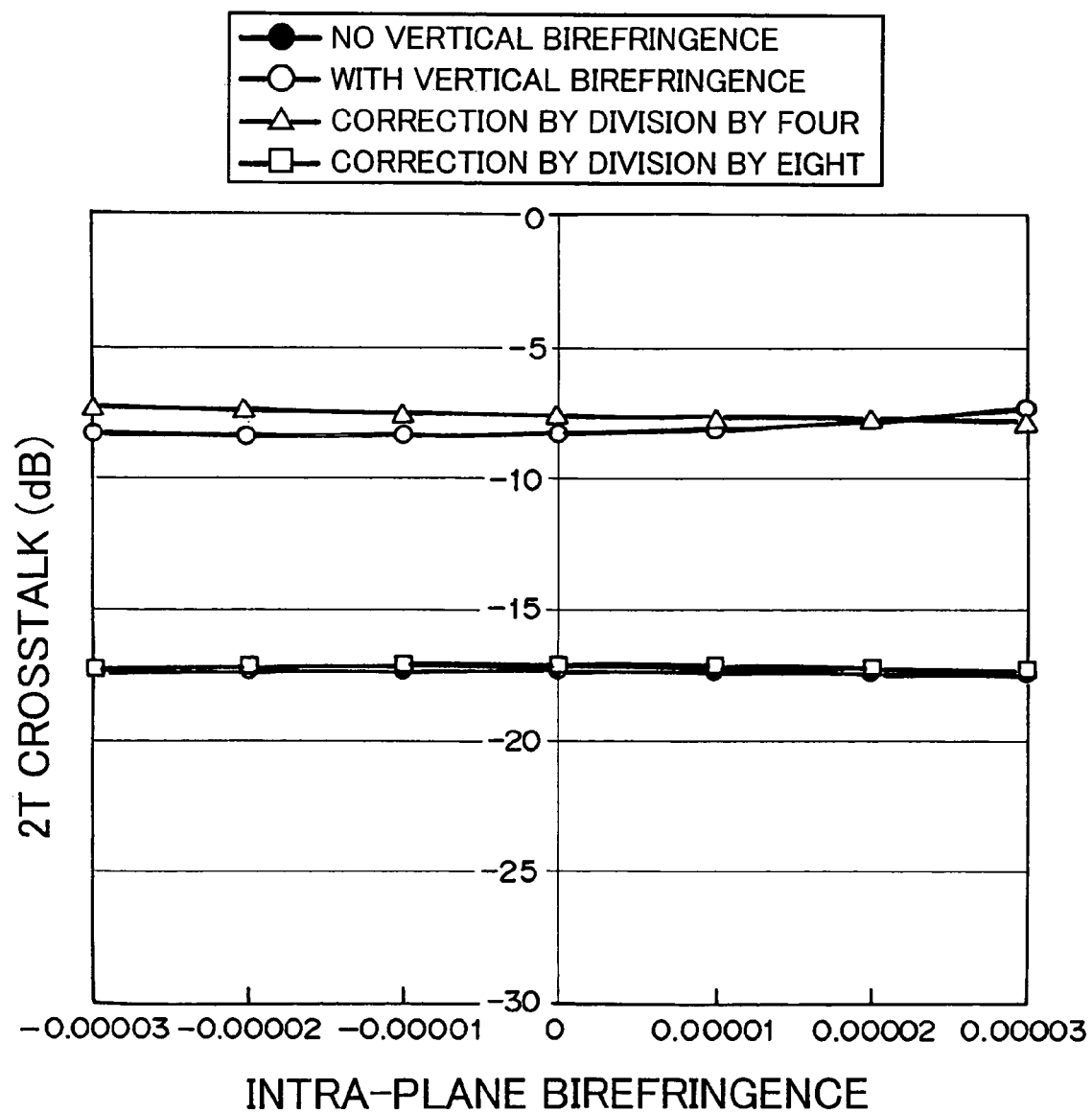
FIG. 10 is a graph illustrating the computationally determined relationship between the intra-plane birefringence of the protection layer of an optical recording medium and the crosstalk of a reproduced signal.

FIG. 10 is a graph illustrating the computationally determined relationship between the intra-plane birefringence of the protection layer of an optical recording medium and the crosstalk of a reproduced signal on the same assumption as the one described above for FIG. 9. The 2T crosstalk of the vertical axis in FIG. 10 is defined by the ratio of the carrier level of 2T signals leaking in from the adjacent tracks to the carrier level of the 2T signal of the own track. In FIG. 10, ● indicates the computationally determined values that are obtained when the vertical birefringence is equal to 0 and ○ indicates the computationally determined. values that are obtained when the vertical birefringence is equal to 0.0007 and not corrected by means of a birefringence correcting element, whereas ∆ indicates the computationally determined values that are obtained when the vertical birefringence is equal to 0.0007 and corrected by means of a birefringence correcting element 5a or the birefringence correcting element 5b circumferentially divided into four regions as illustrated respectively in FIGS. 2 and 3 and □ indicates the computationally determined values that are obtained when the vertical birefringence is equal to 0.0007 and corrected by means of a birefringence correcting element 5c or a birefringence correcting element 5d circumferentially divided into eight regions as illustrated respectively in FIGS. 4 and 5.

As seen from FIG. 10, the 2T crosstalk does not depend on the intra-plane birefringence and is about −17.4 dB when the vertical birefringence is equal to 0. However, the 2T crosstalk slightly depends on the intra-plane birefringence and is raised to about −8.3 dB at the intra-plane birefringence of 0 when the vertical birefringence is equal to 0.0007 and not corrected by means of a birefringence correcting element. On the other hand, the 2T crosstalk scarcely depends on the intra-plane birefringence and is equal to about −7.6 dB when the vertical birefringence is 0.0007 and the birefringence is corrected by means of a birefringence correcting element that is circumferentially divided into four regions. Additionally, the 2T crosstalk scarcely depends on the intra-plane birefringence and is equal to about −17.2 dB when the vertical birefringence is 0.0007 and the birefringence is corrected by means of a birefringence correcting element that is circumferentially divided into eight regions.

From the above, it will be appreciated that the increase in the crosstalk of the reproduced signal due to the vertical birefringence cannot necessarily be suppressed by means of a birefringence correcting element that is circumferentially divided into four regions, whereas the increase in the crosstalk of the reproduced signal due to the vertical birefringence can be almost completely suppressed by means of a birefringence correcting element that is circumferentially divided into eight regions. Additionally, the variances of the crosstalk of the reproduced signal that depend on the radial position of the optical recording medium can be suppressed by means of a birefringence correcting element.

Each of the birefringence correcting element 5a and the birefringence correcting element 5b illustrated respectively in FIGS. 2 and 3 is circumferentially divided into four regions and each of the regions is further radially divided into four sub-regions. Each of the birefringence correcting element 5c and the birefringence correcting element 5d illustrated respectively in FIGS. 4 and 5 is circumferentially divided into eight regions and each of the regions is further radially divided into four sub-regions. However, it is not necessary for the birefringence correcting element of an optical head device according to the invention to be circumferentially divided into four or eight regions and it may alternatively circumferentially divided into regions of any other number. Similarly, it is not necessary for the each of the regions of the birefringence correcting element of an optical head device according to the invention to be radially divided into four sub-regions and it may alternatively radially be divided into sub-regions of any other number. The effect of suppressing the increase of the diameter of the spot of converged light, the fall of the resolution of the reproduced signal and the rise of the crosstalk is raised when the birefringence correcting element is circumferentially divided into a large number of regions and each of the regions is radially divided into a large number of sub-regions. On the other hand, the ease of preparing the birefringence correcting element is raised when the birefringence correcting element is circumferentially divided into a small number of regions and each of the regions is radially divided into a small number of sub-regions.

The fifth embodiment of optical head device according to the invention differs from the first embodiment only in that the birefringence correcting element 5a of the first embodiment is replaced by a birefringence correcting element 5e. Otherwise, the fifth embodiment has the same configuration as that of the first embodiment illustrated in FIG. 1.

Figure 11:
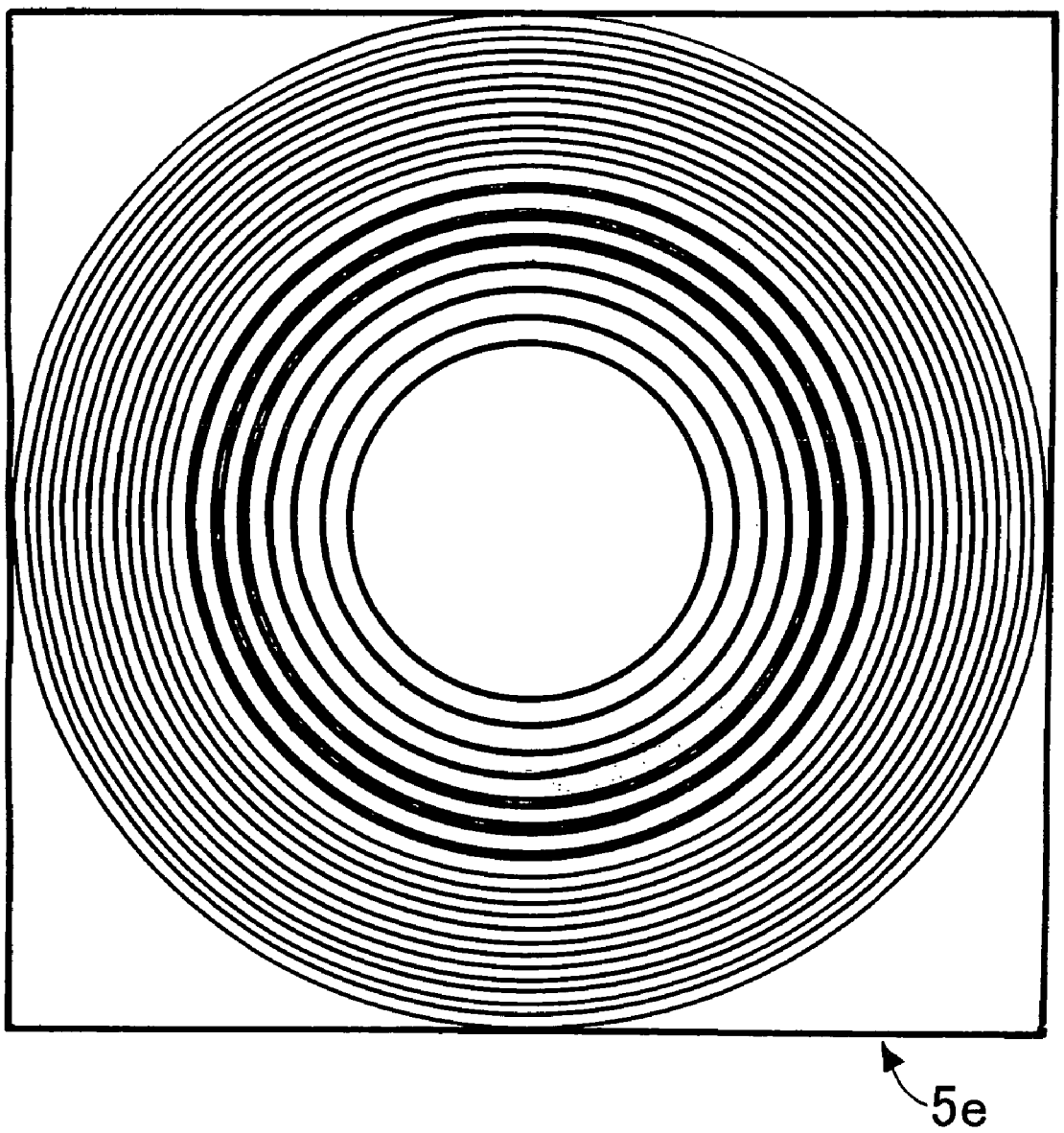
FIG. 11 is a schematic plan view of the birefrinqence correcting element of a fifth embodiment of optical head device according to the invention.

FIG. 11 is a schematic plan view of the birefringence correcting element 5e. The birefringence correcting element 5e has a concentrically formed lattice that is centered at the optical axis. It does not contain a material showing mono-axial refractive index anisotropy but is realized by making a material having refractive index isotropy to show mono-axial refractive index anisotropy, utilizing structural birefringence. In this instance, the direction of the optic axis of the birefringence correcting element 5e is parallel with or perpendicular to the lattice. Thus, as a result of forming a concentric lattice, it is possible to make the direction of the optic axis agree with a radial direction or a tangential direction of a circle that is rotationally symmetric relative to the optical axis and centered at the optical axis. In other words, the direction of the optic axis can be made to continuously change.

When the period of the lattice is sufficiently small relative to the wavelength of incident light, the lattice does not diffract incident light but operates as a wave plate relative to incident light. If the refractive indexes of the two mediums of the lattice are n1 and n2 and the ratios that the mediums respectively occupy in a period of the lattice are q and 1-q (q being the duty ratio of the lattice), while effective refractive index of the polarized component that is parallel with the lattice and the effective refractive index of the polarized component that is perpendicular to the lattice are n∥ and n⊥ respectively, n∥ and n⊥ are defined by the mathematical formulas shown below respectively.

$$n_\| = (n_1^2 q + n_2^2 (1-q))^{\frac{1}{2}} \quad \text{[formula 10]}$$

$$n_\perp = \left[ \left(\frac{1}{n_1}\right)^2 q + \left(\frac{1}{n_2}\right)^2 (1-q) \right]^{-\frac{1}{2}} \quad \text{[formula 11]}$$

Figure 12:
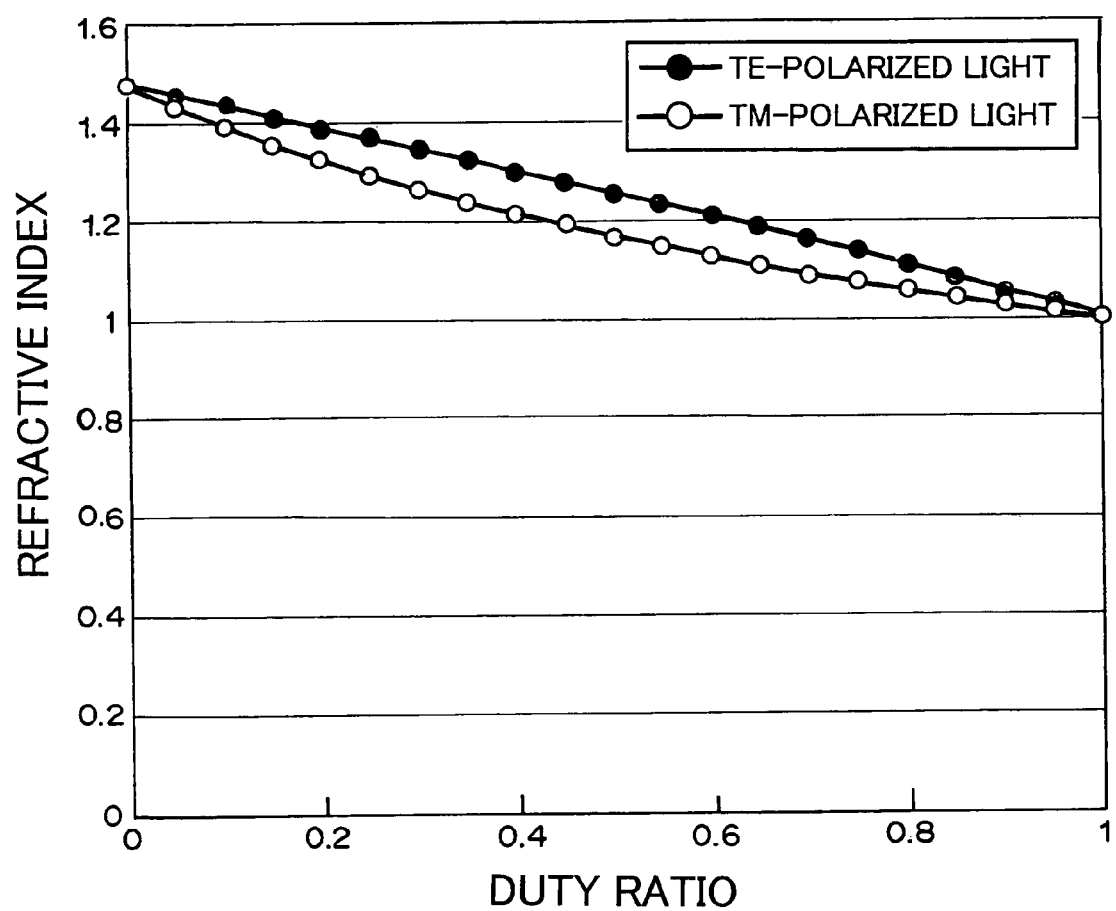
FIG. 12 is a graph illustrating the computationally determined relationship between the duty ratio of the lattice and the effective refractive index of the birefringence correcting element of the fifth embodiment of optical head device according to the invention.

FIG. 12 is a graph illustrating the computationally determined relationship between the duty ratio of the lattice and the effective refractive index of the birefringence correcting element of the fifth embodiment of optical head device according to the invention. The two mediums of this embodiment are air and quartz and hence n1=1 and n2=1.47. In FIG. 12, ● indicates the computationally determined values that are obtained for the effective refractive index n∥ relative to the polarized light component that is parallel with the lattice (TE-polarized light) and ○ indicates the computationally determined values that are obtained for the effective refractive index n⊥ relative to the polarized light component that is perpendicular to the lattice (TM-polarized light). If Δn=n∥–n⊥, Δn shows the smallest value of 0 when q=0 and the largest value of 0.0887 when q=0.45.

Figure 13A:
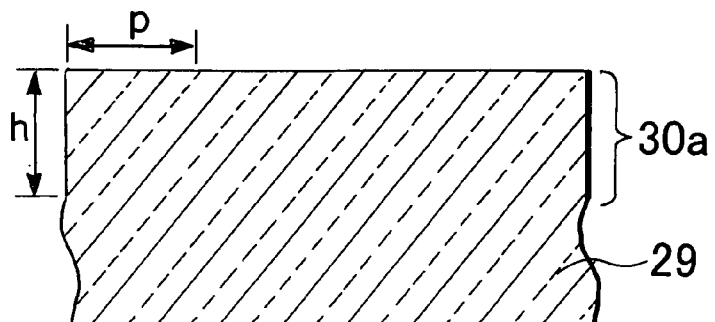
FIGS. 13A through 13D are schematic cross sectional views of the birefringence correcting element of the fifth embodiment of optical head device-according to the invention.
Figure 13B:
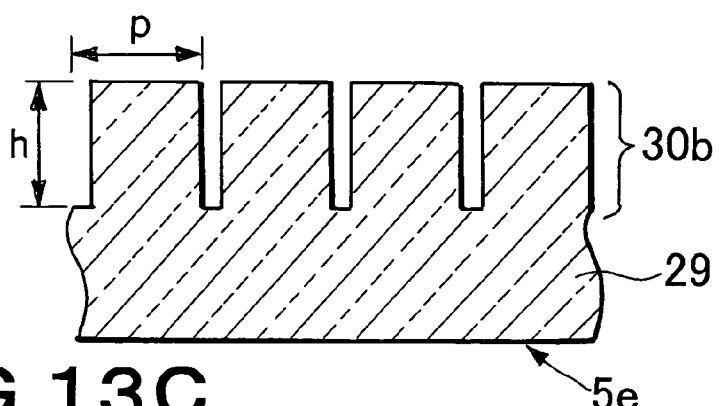
Figure 13C:
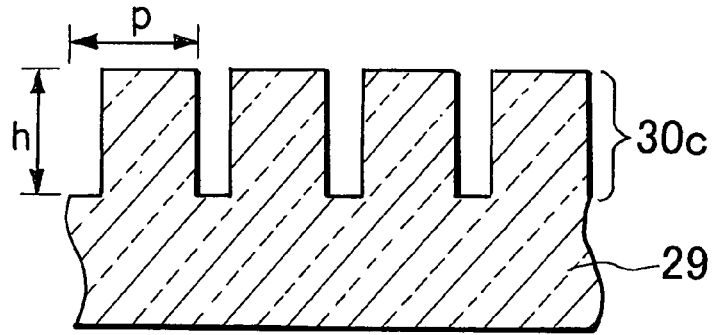
Figure 13D:
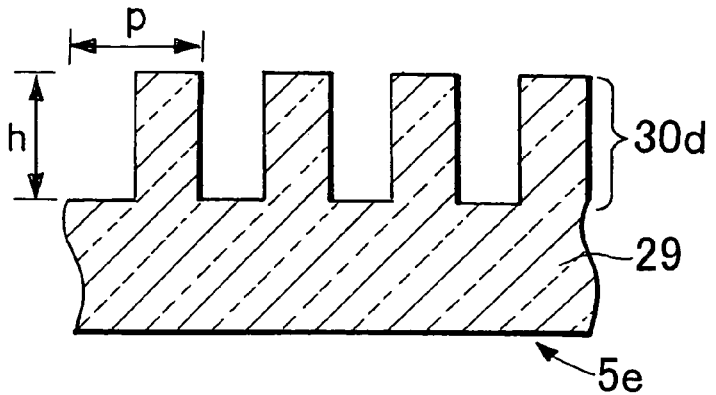

FIGS. 13A through 13D are schematic cross sectional views of the birefringence correcting element 5e. The birefringence correcting element 5e is prepared by forming lattices 30a through 30d on a substrate 29 that is made of quartz. In FIGS. 13A through 13D, p denotes the period of each of the lattices 30a through 30d and h denotes the height of each of the lattices 30a through 30d. The value of p is sufficiently small relative to the wavelength of incident light. If the wavelength of incident light is λ the phase difference of the birefringence correcting element 5e is defined as 2 πhΔn/λ. The duty ratio of the lattice 30a of FIG. 13A is 0 and that of the lattice 30d of FIG. 13D is 0.45. The duty ratios of the lattices 30a through 30d of FIGS. 13A through 13D are increased in the mentioned order. Thus, the phase differences of the birefringence correcting element 5e in FIGS. 13A through 13D are increased in the mentioned order.

The phase difference of the birefringence correcting element 5e can be made to change continuously as a quadratic function of the distance from the optical axis as indicated by the solid line in FIG. 6 by continuously changing the duty ratio of the lattice between 0 and 0.45 as a function of the distance from the optical axis. The phase difference is 0° on the optical axis if q=0 and hence Δn=0. On the other hand, if the distance from the optical axis is equal to the effective radius of the objective lens, which is equal to 1.95 mm, it is sufficient to select a value for h that makes the phase difference equal to 65.7° when q=0.45 and hence Δn=0.0887. Thus, if λ=405 nm, h=833 nm.

It may be appreciated that, although it is somewhat difficult to prepare a birefringence correcting element 5e because of the large ratio of the height of the lattice to the period of the lattice, it is possible to completely suppress the enlargement of the diameter of the spot of converged light, the fall of the resolution and the increase of the crosstalk of the reproduced signal that are produced by the vertical birefringence by means of the birefringence correcting element 5e.

The first through fifth embodiments of optical head device according to the invention are categorized as polarization optical systems that comprise a polarization beam splitter and a ¼ wave plate. However, embodiments that are categorized as non-polarization optical systems and comprise a non-polarization beam splitter can be used for the purpose of the present invention.

In an arrangement realized by using a non-polarization beam splitter, light emitted from a semiconductor laser is made to strike a non-polarization beam splitter and transmitted through it by about 50% before it is converged on a disk by means of an objective lens. Light reflected by the disk is made to strike the non-polarization beam splitter and reflected by about 50% before it is received by a photo-detector.

With the arrangement realized by using a non-polarization beam splitter, the light receiving rate of the photo-detector does not fall if the protection layer of the optical recording medium entails birefringence. Thus, unlike the arrangement realized by using a polarization beam splitter and a ¼ wave plate, this arrangement gives rise to neither a fall of the resolution nor an increase of the crosstalk in the reproduced signal. However, the diameter of the spot of converged light that is formed on the optical recording medium increases when the protection layer of the optical recording medium entails birefringence. Thus, like the arrangement using a polarization beam splitter and a ¼ wave plate, any increase in the diameter of the spot of converged light due to birefringence can give rise to a fall of the resolution and an increase of the crosstalk in the reproduced signal with this arrangement. In other words, with an arrangement using a non-polarization beam splitter, it is possible to suppress the fall of the resolution and the increase of the crosstalk of the reproduced signal due to the vertical birefringence by means of a birefringence correcting element.

Figure 14:
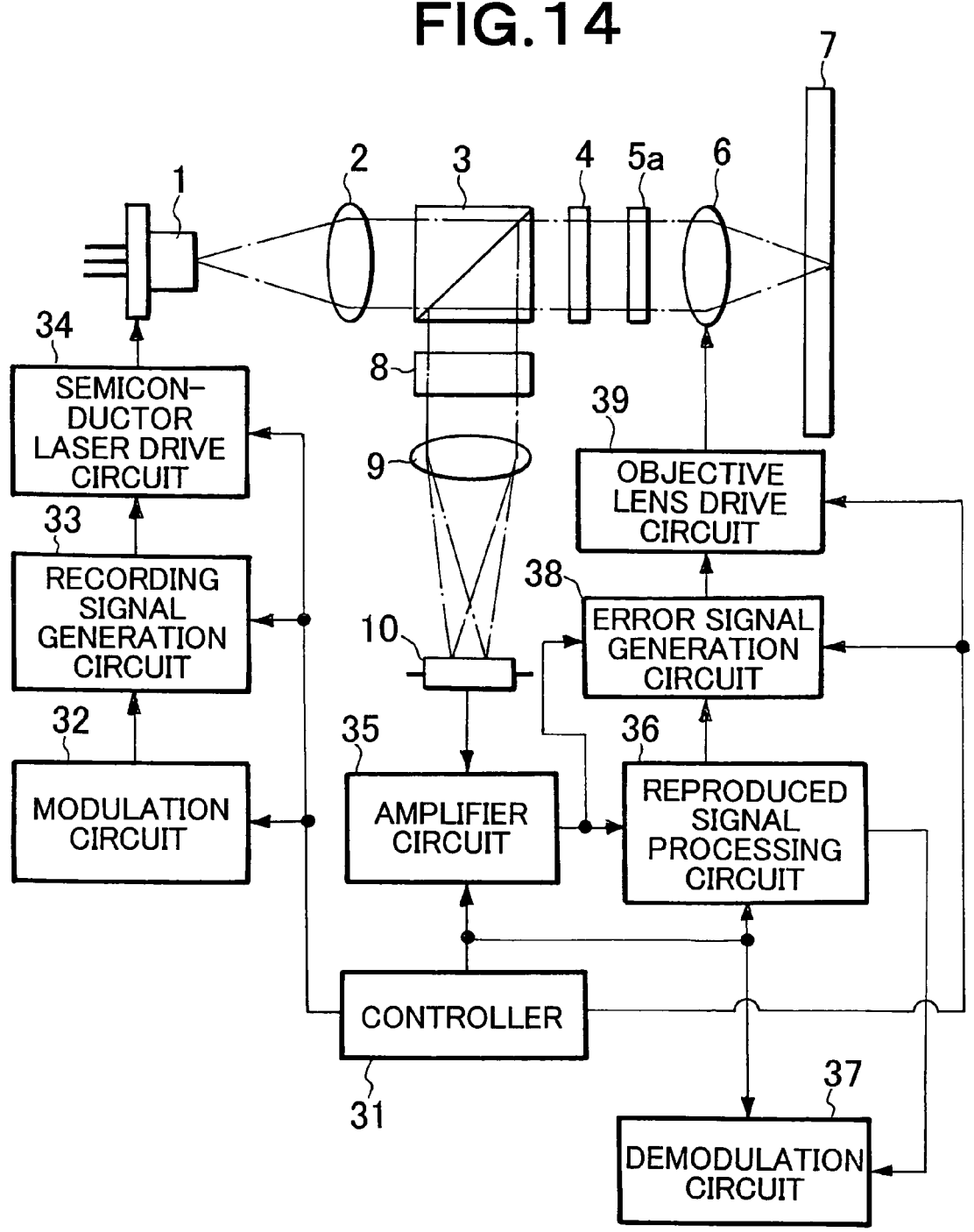
FIG. 14 is a schematic block diagram of an embodiment of optical information recording/reproduction apparatus according to the invention.

FIG. 14 is a schematic block diagram of an embodiment of optical information recording/reproduction apparatus according to the invention. This embodiment comprises a controller 31, a modulation circuit 32, a recording signal generation circuit 33, semiconductor laser drive circuit 34, an amplifier circuit 35, a reproduced signal processing circuit 36, a demodulation circuit 37, an error signal generation circuit 38 and an objective lens drive circuit 39 in addition to the first embodiment of optical head device according to the invention as illustrated in FIG. 1.

The modulation circuit 32 modulates the data to be recorded on the disk 7 according to modulation rules. The recording signal generation circuit 33 generates a recording signal for driving the semiconductor laser 1 according to recording strategies on the basis of the signal modulated by the modulation circuit 32. The semiconductor laser drive circuit 34 drives the semiconductor laser 1 by supplying the semiconductor laser 1 with an electric current that corresponds to the recording signal on the basis of the recording signal generated by the recording signal generation circuit 33. As a result, data are recorded on the disk 7.

On the other hand, the amplifier circuit 35 amplifies the output of each of the light receiving sections of the photo-detector 10. The reproduced signal processing circuit 36 performs an operation of generation of an RF signal, equalization of the waveform and binarization of the signal on the basis of the signal amplified by the amplifier circuit 35. The demodulation circuit 37 demodulates the signal binarized by the reproduced signal processing circuit 36 according to demodulation rules. As a result, data are reproduced from the disk 7.

The error signal generation circuit 38 generates a focus error signal and a track error signal on the basis of the signal amplified by the amplifier circuit 35. The objective lens drive circuit 39 drives the objective lens 6 by means of an actuator (not shown) for driving the objective lens 6 with an electric current that corresponds to the error signal on the basis of the error signal that is generated by the error signal generation circuit 38.

Additionally, the optical system other than the disk 7 is driven in a radial direction of the disk 7 by means of a positioner (not shown), while the disk 7 is driven to rotate by means of a spindle (not shown). As a result, the focus, the track, the positioner and the spindle are servo-controlled.

The circuits from the modulation circuit 32 to the semiconductor laser drive circuit 34 that participate in recording data, the circuits from the amplifier circuit 35 to the demodulation circuit 37 that participate in reproducing data and the circuits from the amplifier circuit 35 to the objective lens drive circuit 39 that participate in servo-control are controlled by the controller 31.

This embodiment is a recording/reproduction apparatus adapted to record data on and reproduce data from a disk 7. An embodiment dedicated to reproduce data from a disk 7 can be realized for an optical information recording/reproduction apparatus according to the invention. In such an embodiment, the semiconductor laser 1 is driven by the semiconductor laser drive circuit 34 not on the basis of the recording signal but in such a way that the power of emitted light shows a constant level.

Another embodiment of optical information recording/reproduction apparatus according to the invention may be realized so as to comprise a controller 31, a modulation circuit 32, a recording signal generation circuit 33, a semiconductor laser drive circuit 34, an amplifier circuit 35, a reproduced signal processing circuit 36, a demodulation circuit 37, an error signal generation circuit 38 and an objective lens drive circuit 39 in addition to one of the second through fifth embodiment of optical head device according to the invention.

What is claimed is:

1. An optical head device comprising:
    a light source;
    an objective lens for converging an emitted light emitted from the light source on an optical recording medium;
    a photo-detector for receiving a reflected light reflected by the optical recording medium;
    an optical separator element for separating the emitted light and the reflected light; and
    a birefringence correcting element for correcting an influence of birefringence of a protection layer of the optical recording medium on the emitted light or reflected light,
    wherein the birefringence correcting element has an optic axis whose direction in a plane of the birefringence correcting element changes as a function of an intra-plane position thereof on the birefringence correcting element and a phase difference between a polarized light component polarized in a direction parallel to the optic axis and another polarized light component polarized in a direction vertical to the optic axis changes as a function of intra-plane positions thereof on the birefringence correcting element.

2. The optical head device as claimed in claim 1, wherein the birefringence correcting element is arranged between the optical separator element and the objective lens.

3. The optical head device as claimed in claim 1, wherein the birefringence correcting element is made to produce a phase difference necessary for offsetting a phase difference produced when emitted light or reflected light is transmitted through the protection layer of the optical recording medium at the time when emitted light or reflected light is transmitted through the birefringence correcting element.

4. The optical head device as claimed in claim 1, wherein the birefringence correcting element contains a material showing mono-axial refractive index anisotropy.

5. The optical head device as claimed in claim 1, wherein the birefringence correcting element is circumferentially divided into a plurality of regions around the optical axis of emitted light or reflected light by at least one straight line passing through the optical axis and each of the plurality of regions produced around the optical axis by the division is radially divided into a plurality of sub-regions by at least one circle centered at the optical axis.

6. The optical head device as claimed in claim 5, wherein the direction of the optic axis in the plurality of regions produced by circumferential division around the optical axis is fixed in each of the regions to a radial direction or a tangential direction of a circle centered at the optical axis in a circumferentially central part of each of the regions.

7. The optical head device as claimed in claim 5, wherein the phase difference in the plurality of sub-regions formed by radial division is fixed in each of the sub-regions and monotonously increases from the inner sub-regions toward the outer sub-regions along the radial direction.

8. The optical head device as claimed in claim 4, wherein the material showing mono-axial refractive index anisotropy is a liquid crystal polymer.

9. The optical head device as claimed in claim 1, wherein the birefringence correcting element is made of a material showing refractive index isotropy and made further to show mono-axial refractive index anisotropy by utilizing structural birefringence.

10. The optical head device as claimed in claim 9, wherein the birefringence correcting element is made to have a concentric circular lattice centered at the optical axis of emitted light or reflected light.

11. The optical head device as claimed in claim 10, wherein the lattice comprises projections and recesses and, assuming that a ratio of an area occupied by projection to an area occupied by recesses in a period of the lattice is expressed as duty ratio, the duty ratio is made to change continuously as a function of the distance from the optical axis.

12. An optical information recording/reproduction apparatus comprising:
    an optical head device claimed in any one of claims 1 to 11;
    a first circuit for driving the light source;
    a second circuit for generating a reproduction signal and an error signal according to an output signal of the photo-detector; and
    a third circuit for controlling a position of the objective lens according to the error signal.

13. The optical information recording/reproduction apparatus as claimed in claim 12, wherein the first circuit drives the light source so as to make a power of the emitted light change as a function of a signal to be recorded.

14. The optical information recording/reproduction apparatus as claimed in claim 12, wherein the first circuit drives the light source so as to make a power of the emitted light show a fixed value.

* * * * *